(12) United States Patent
Ikeda et al.

(10) Patent No.: US 10,533,137 B2
(45) Date of Patent: Jan. 14, 2020

(54) LIQUID CRYSTAL COMPOSITION, METHOD FOR PRODUCING RETARDATION LAYER, AND CIRCULARLY POLARIZING PLATE

(71) Applicant: ZEON CORPORATION, Chiyoda-ku, Tokyo (JP)

(72) Inventors: Akira Ikeda, Tokyo (JP); Hiroaki Shu, Tokyo (JP); Shunpei Nakajima, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 0 days.

(21) Appl. No.: 15/558,196

(22) PCT Filed: Mar. 11, 2016

(86) PCT No.: PCT/JP2016/057717
§ 371 (c)(1),
(2) Date: Sep. 14, 2017

(87) PCT Pub. No.: WO2016/148047
PCT Pub. Date: Sep. 22, 2016

(65) Prior Publication Data
US 2018/0072952 A1    Mar. 15, 2018

(30) Foreign Application Priority Data

Mar. 19, 2015 (JP) ................... 2015-055626

(51) Int. Cl.
*C09K 19/38* (2006.01)
*C09K 19/54* (2006.01)
(Continued)

(52) U.S. Cl.
CPC .............. *C09K 19/54* (2013.01); *C09K 19/12* (2013.01); *C09K 19/2007* (2013.01);
(Continued)

(58) Field of Classification Search
CPC ........................................................ G02F 1/13
See application file for complete search history.

(56) References Cited

U.S. PATENT DOCUMENTS

| 2007/0134444 A1 | 6/2007 | Harding et al. |
| 2009/0052030 A1* | 2/2009 | Kaida ................... B82Y 10/00 |
| | | 359/485.05 |

(Continued)

FOREIGN PATENT DOCUMENTS

| EP | 3037444 A1 | 6/2016 |
| JP | 2001330725 A * | 11/2001 |

(Continued)

OTHER PUBLICATIONS

Sep. 19, 2017, International Preliminary Report on Patentability issued in the International Patent Application No. PCT/JP2016/057717.

(Continued)

*Primary Examiner* — Chanceity N Robinson
(74) *Attorney, Agent, or Firm* — Kenja IP Law PC

(57) ABSTRACT

A liquid crystal composition including: a polymerizable liquid crystal compound capable of expressing birefringence with inverse wavelength dispersion; a surfactant containing a fluorine atom; and a solvent, wherein the surfactant contains a fluorine atom at a ratio of 30% by weight or less in a molecule of the surfactant.

6 Claims, 17 Drawing Sheets

(51) Int. Cl.
| | |
|---|---|
| *G02B 5/30* | (2006.01) |
| *G02F 1/13* | (2006.01) |
| *G02F 1/13363* | (2006.01) |
| *C09K 19/52* | (2006.01) |
| *C09K 19/32* | (2006.01) |
| *C09K 19/34* | (2006.01) |
| *C09K 19/20* | (2006.01) |
| *C09K 19/24* | (2006.01) |
| *C09K 19/12* | (2006.01) |
| *C09K 19/04* | (2006.01) |

(52) U.S. Cl.
CPC .......... *C09K 19/2014* (2013.01); *C09K 19/24* (2013.01); *C09K 19/32* (2013.01); *C09K 19/322* (2013.01); *C09K 19/3469* (2013.01); *C09K 19/3486* (2013.01); *C09K 19/3491* (2013.01); *C09K 19/3497* (2013.01); *C09K 19/38* (2013.01); *C09K 19/52* (2013.01); *G02B 5/30* (2013.01); *G02B 5/3016* (2013.01); *G02F 1/13* (2013.01); *G02F 1/13363* (2013.01); *C09K 2019/0448* (2013.01); *C09K 2019/122* (2013.01); *C09K 2019/123* (2013.01); *C09K 2019/2078* (2013.01); *C09K 2019/525* (2013.01); *C09K 2019/528* (2013.01)

(56) References Cited

U.S. PATENT DOCUMENTS

| | | | | |
|---|---|---|---|---|
| 2010/0007828 | A1* | 1/2010 | Nimura | G02B 5/3016 349/117 |
| 2010/0143612 | A1* | 6/2010 | Hirai | C09K 19/20 428/1.25 |
| 2010/0285008 | A1 | 11/2010 | Kelley | |
| 2010/0297113 | A1 | 11/2010 | Kelley et al. | |
| 2013/0100367 | A1* | 4/2013 | Takahashi | B29D 11/00644 349/15 |
| 2015/0175564 | A1* | 6/2015 | Sakamoto | C07D 417/12 526/257 |
| 2015/0265564 | A1 | 9/2015 | Kelley | |
| 2015/0277007 | A1 | 10/2015 | Matsuyama et al. | |
| 2016/0115338 | A1 | 4/2016 | Kuwana et al. | |
| 2017/0077159 | A1* | 3/2017 | Kubota | G02B 7/021 |
| 2017/0198176 | A1* | 7/2017 | Kamochi | C09J 11/06 |

FOREIGN PATENT DOCUMENTS

| | | | | |
|---|---|---|---|---|
| JP | 2005336103 | A | 12/2005 | |
| JP | 2006111571 | A | 4/2006 | |
| JP | 2007177241 | A | 7/2007 | |
| JP | 2009242564 | A | 10/2009 | |
| JP | 2011207765 | A | 10/2011 | |
| JP | 2013076851 | A | 4/2013 | |
| JP | 2015111257 | A | 6/2015 | |
| JP | 2015200877 | A | 11/2015 | |
| JP | 2016047813 | A | 4/2016 | |
| WO | 2009042544 | A1 | 4/2009 | |
| WO | WO-2014010325 | A1 * | 1/2014 | .......... C07D 417/12 |
| WO | 2014192655 | A1 | 12/2014 | |
| WO | 2015025793 | A1 | 2/2015 | |

OTHER PUBLICATIONS

May 17, 2016, International Search Report issued in the International Patent Application No. PCT/JP2016/057717.

Jul. 9, 2018, the Extended European Search Report issued by the European Patent Office in the corresponding European Patent Application No. 16764877.3.

May 27, 2019, Communication pursuant to Article 94(3) EPC issued by the European Patent Office in the corresponding European Patent Application No. 16764877.3.

* cited by examiner

Comparative Example 3

Comparative Example 5

LIQUID CRYSTAL COMPOSITION, METHOD FOR PRODUCING RETARDATION LAYER, AND CIRCULARLY POLARIZING PLATE

FIELD

The present invention relates to a liquid crystal composition, a method for producing a retardation layer using the liquid crystal composition, and a circularly polarizing plate.

BACKGROUND

A display device may be provided with a circularly polarizing plate to suppress reflection on a viewing surface of the display device. Such a circularly polarizing plate is usually provided with a linear polarizer and a retardation layer.

As one of methods for obtaining the retardation layer described above, a method using a polymerizable liquid crystal compound is known. Usually, in this method, a composition containing a polymerizable liquid crystal compound is applied onto a surface of an appropriate substrate to form a layer, the polymerizable liquid crystal compound in the layer is oriented, and the polymerizable liquid crystal compound is then polymerized while the oriented state is maintained, to form a retardation layer (see Patent Literatures 1 to 3).

CITATION LIST

Patent Literature

Patent Literature 1: Japanese Patent Application Laid-Open No. 2009-242564 A

Patent Literature 2: Japanese Patent Application Laid-Open No. 2013-076851 A

Patent Literature 3: Japanese Patent Application Laid-Open No. 2007-177241 A

SUMMARY

Technical Problem

However, in prior art techniques as described in Patent Literatures 1 to 3, it is difficult to obtain a retardation layer having both excellent surface state and orientation using a polymerizable liquid crystal compound that can express birefringence with inverse wavelength dispersion.

The present invention has been made in view of the problems mentioned above. An object of the present invention is to provide a liquid crystal composition that enables to produce a retardation layer having both excellent surface state and orientation using a polymerizable liquid crystal compound that can express birefringence with inverse wavelength dispersion; a method for producing the retardation layer having both excellent surface state and orientation using the polymerizable liquid crystal compound that can express birefringence with inverse wavelength dispersion; and a circularly polarizing plate provided with the retardation layer having both excellent surface state and orientation.

Solution to Problem

The present inventors have intensively studied to solve the aforementioned problems. As a result, the inventors have found that a retardation layer having both excellent surface state and orientation can be produced using a liquid crystal composition including a polymerizable liquid crystal compound that can express birefringence with inverse wavelength dispersion, a surfactant containing a fluorine atom at a specific ratio, and a solvent. The present invention has thus been completed.

Specifically, the present invention is as follows.

(1) A liquid crystal composition comprising:
a polymerizable liquid crystal compound capable of expressing birefringence with inverse wavelength dispersion;
a surfactant containing a fluorine atom; and
a solvent, wherein
the surfactant contains a fluorine atom at a ratio of 30% by weight or less in a molecule of the surfactant.

(2) The liquid crystal composition according to (1), wherein the polymerizable liquid crystal compound includes a main chain mesogen and a side chain mesogen bonded to the main chain mesogen in a molecule of the polymerizable liquid crystal compound.

(3) The liquid crystal composition according to (1) or (2), wherein the polymerizable liquid crystal compound is represented by the following Formula (I):

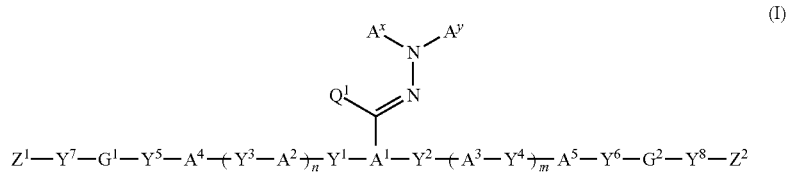

(in the Formula (I), $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; provided that a case where two or more —O— or —S— groups are adjacently inserted are excluded, wherein R$^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —SO$_2$—$R^4$, —C(=S)NH—$R^9$, or an organic group of 2 to 30 carbon atoms having at least one aromatic ring selected from the group consisting of an aromatic hydrocarbon ring and an aromatic heterocyclic ring, wherein $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; $R^4$ is an alkyl group of 1 to 20 carbon atoms, an alkenyl group of 2 to 20 carbon atoms, a phenyl group, or a 4-methylphenyl group; $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m and n are each independently 0 or 1).

(4) A method for producing a retardation layer, comprising the steps of:

applying the liquid crystal composition according to any one of (1) to (3) onto a supporting surface to form a layer of the liquid crystal composition;

orienting the polymerizable liquid crystal compound contained in the layer of the liquid crystal composition; and polymerizing the polymerizable liquid crystal compound to obtain the retardation layer.

(5) A circularly polarizing plate comprising:

a linear polarizer; and a retardation layer produced by the method according to (4).

Advantageous Effects of Invention

According to the liquid crystal composition of the present invention, a retardation layer having both excellent surface state and orientation can be produced using a polymerizable liquid crystal compound that can express birefringence with inverse wavelength dispersion.

According to the method for producing a retardation layer of the present invention, a retardation layer having both excellent surface state and orientation can be produced using a polymerizable liquid crystal compound that can express birefringence with inverse wavelength dispersion.

The circularly polarizing plate of the present invention is provided with a retardation layer having both excellent surface state and orientation.

DESCRIPTION OF EMBODIMENTS

Figure 1:
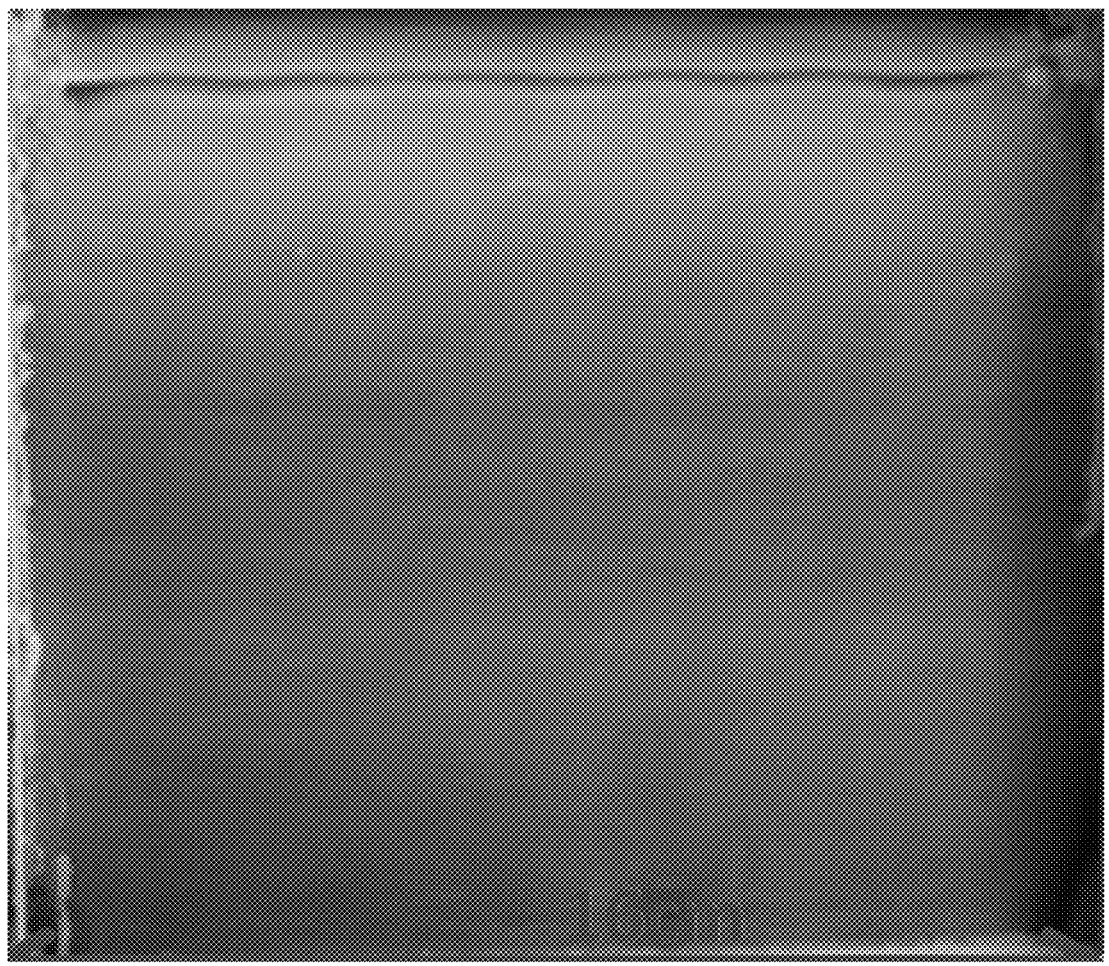
FIG. 1 is a view showing an image of a retardation layer observed in Example 2 of the present invention.
Figure 2:
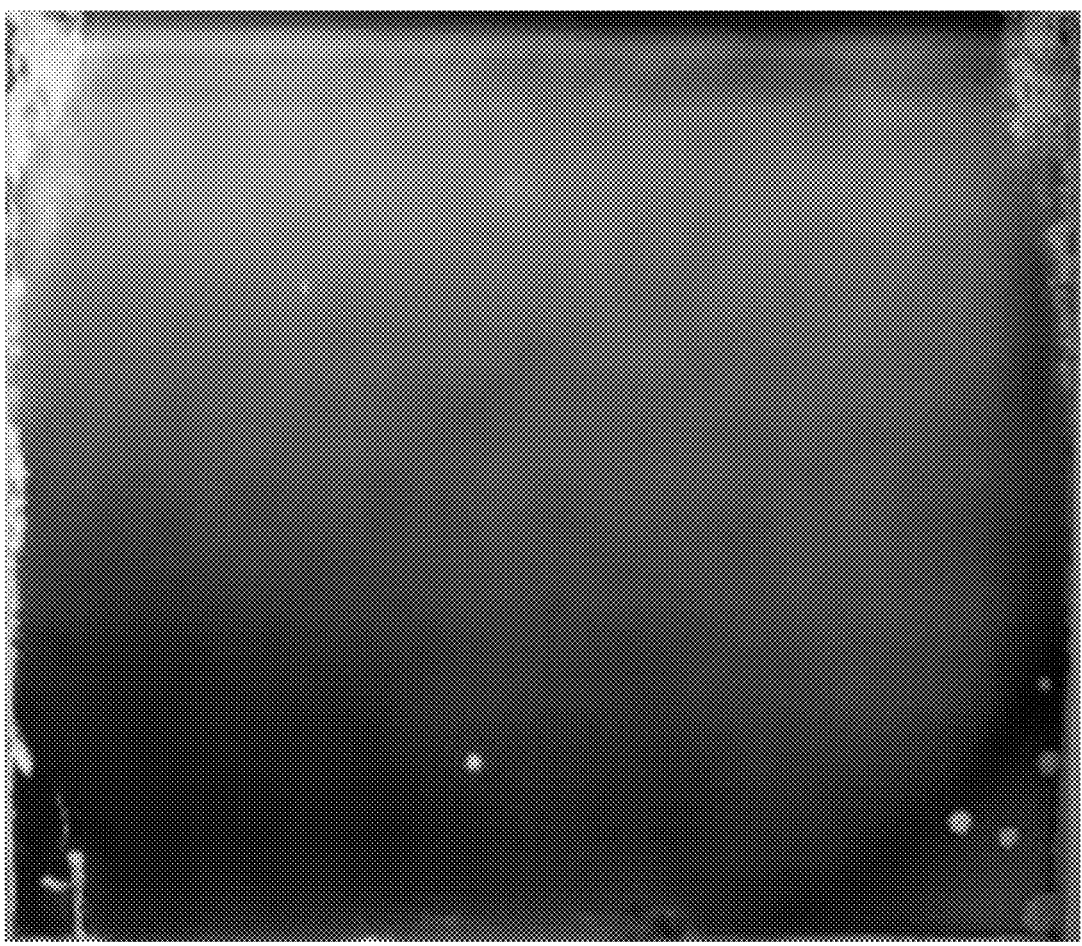
FIG. 2 is a view showing an image of a retardation layer observed in Example 5 of the present invention.
Figure 3:
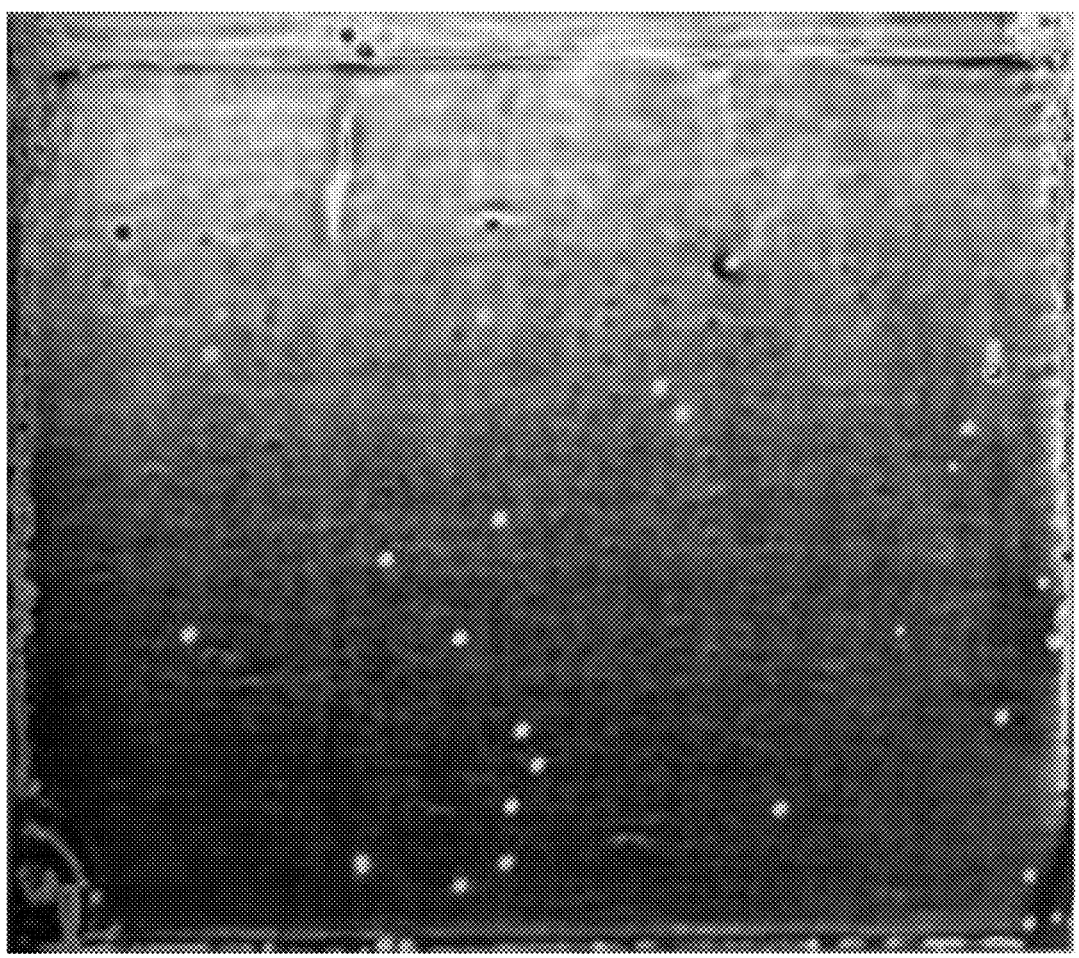
FIG. 3 is a view showing an image of a retardation layer observed in Comparative Example 3.
Figure 4:
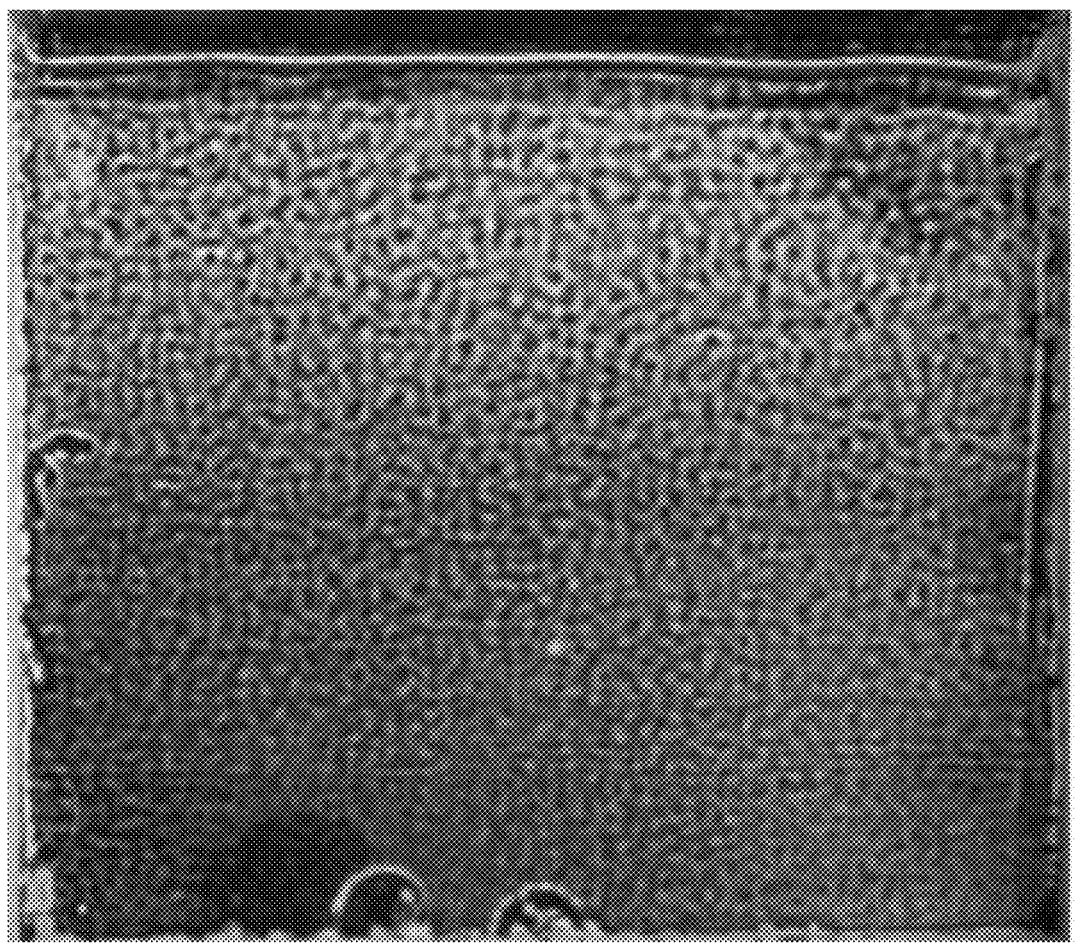
FIG. 4 is a view showing an image of a retardation layer observed in Comparative Example 5.
Figure 5:
FIG. 5 is a view, which is represented as a mapping, showing a retardation measured in Example 2 of the present invention.
Figure 6:
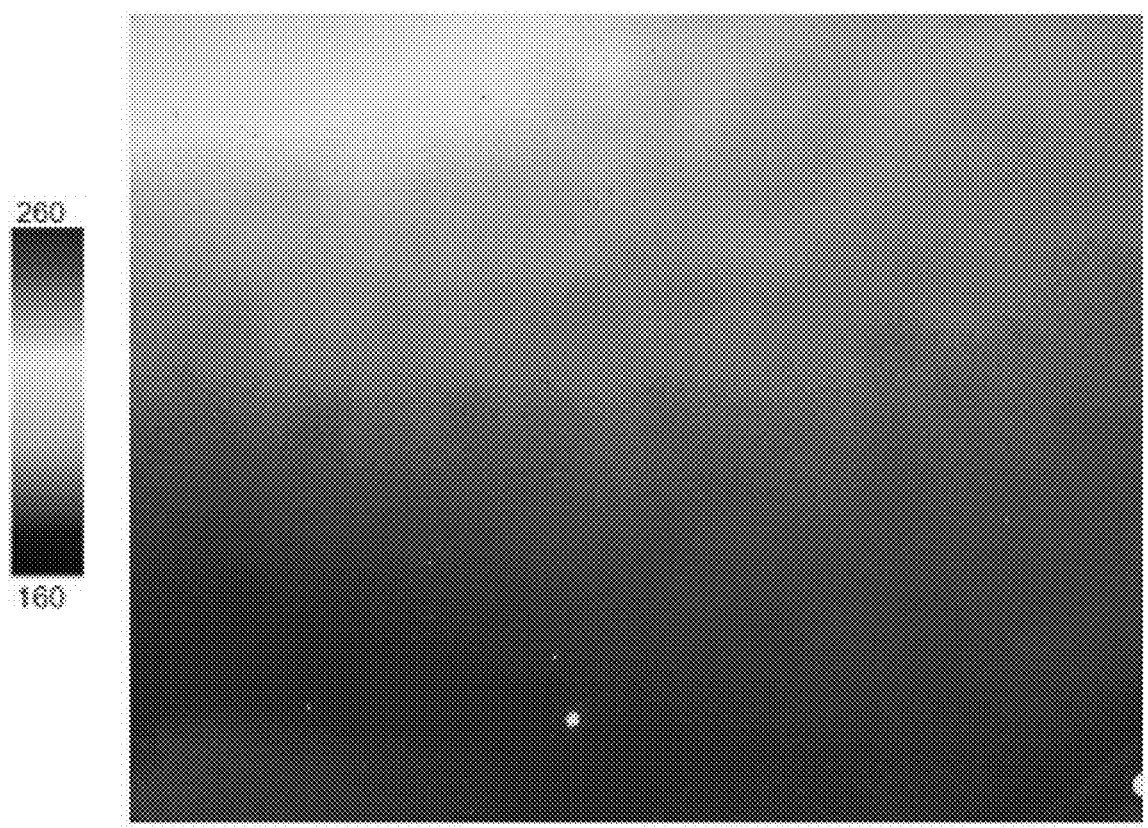
FIG. 6 is a view, which is represented as a mapping, showing a retardation measured in Example 5 of the present invention.
Figure 7:
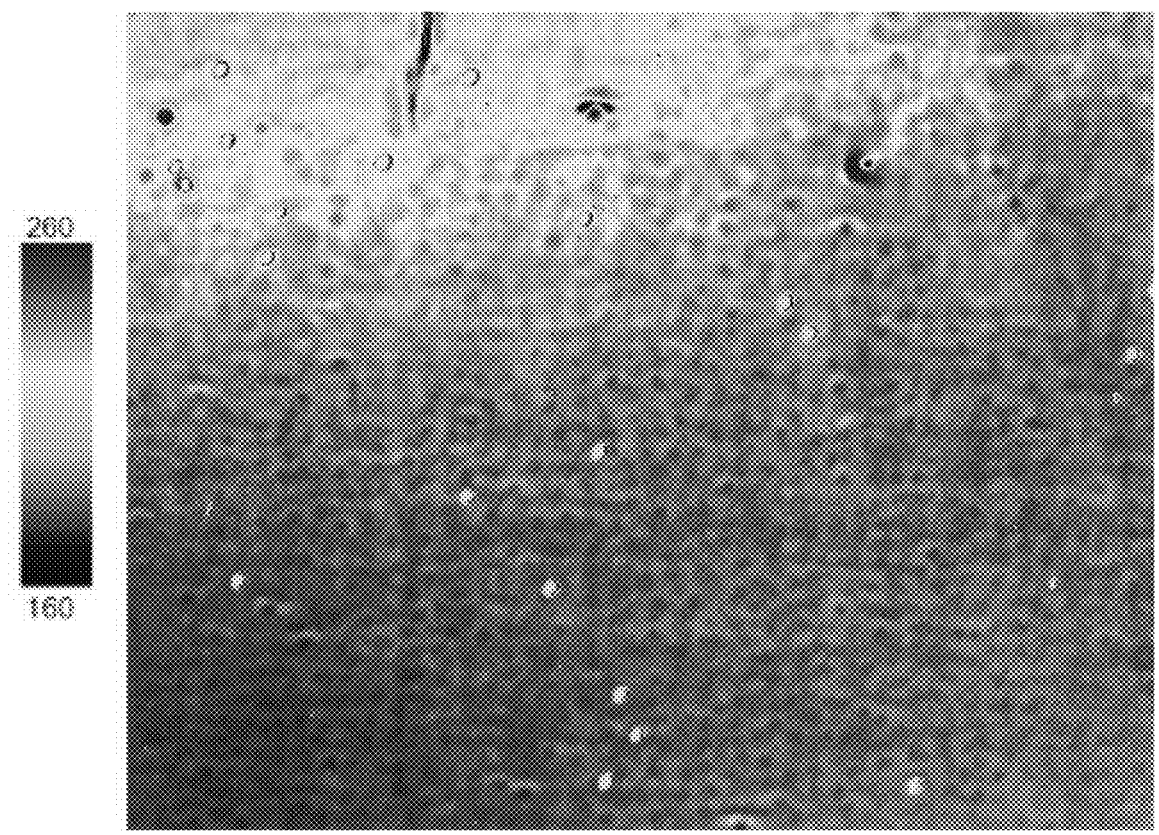
FIG. 7 is a view, which is represented as a mapping, showing a retardation measured in Comparative Example 3.
Figure 8:
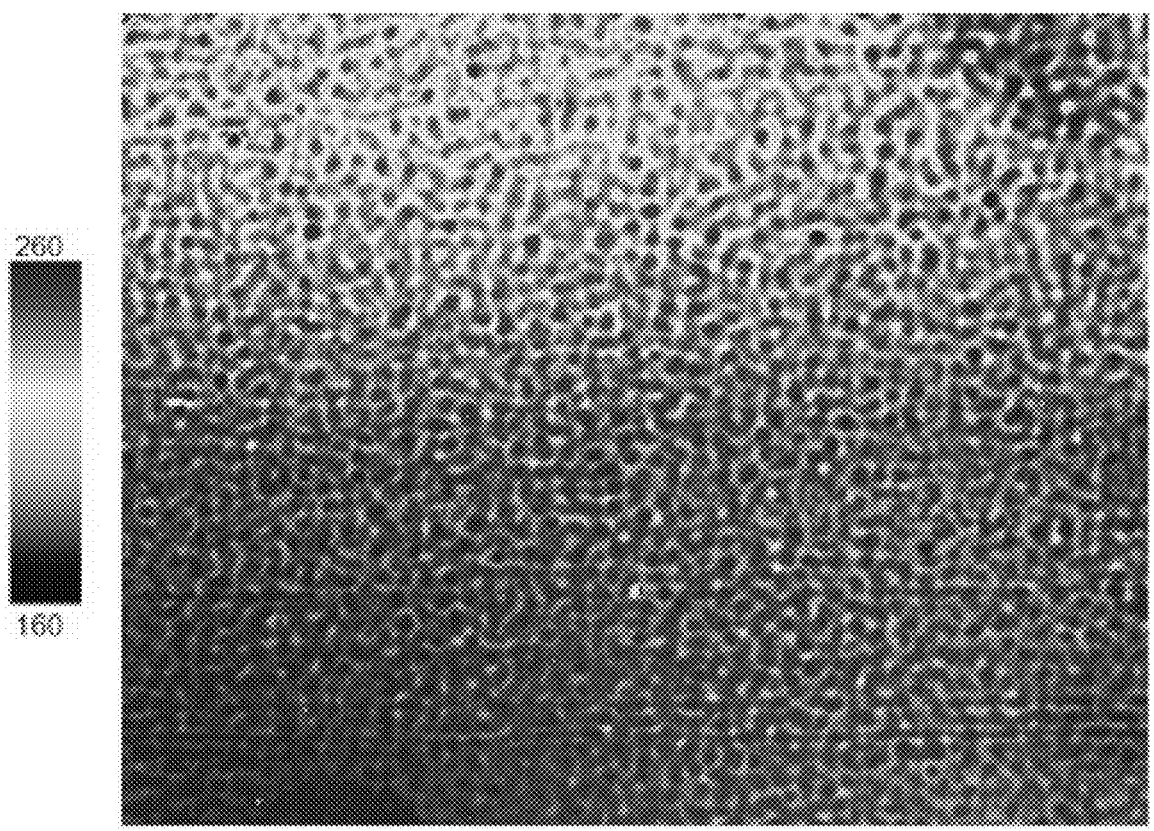
FIG. 8 is a view, which is represented as a mapping, showing a retardation measured in Comparative Example 5.
Figure 9:
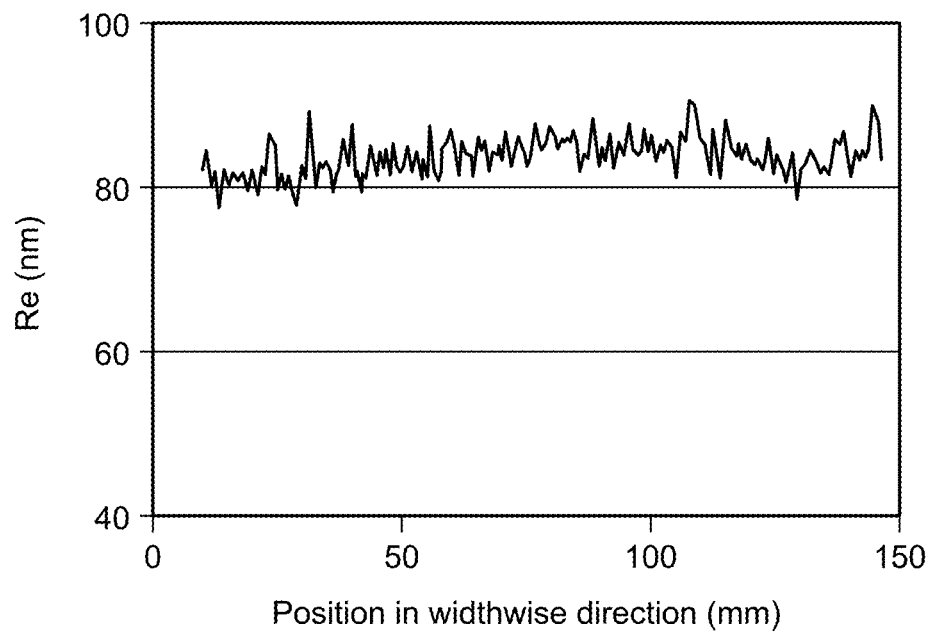
FIG. 9 is a view, which is represented as a graph, illustrating the retardation at points on a line parallel to the widthwise direction of the retardation layer measured in Example 2 of the present invention.
Figure 10:
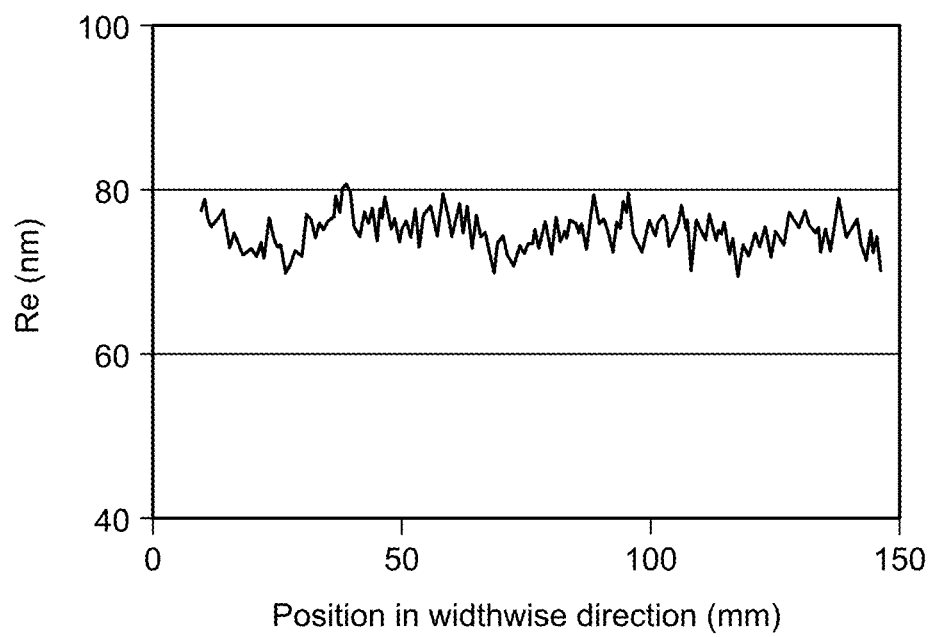
FIG. 10 is a view, which is represented as a graph, illustrating the retardation at points on a line parallel to the widthwise direction of the retardation layer measured in Example 5 of the present invention.
Figure 11:
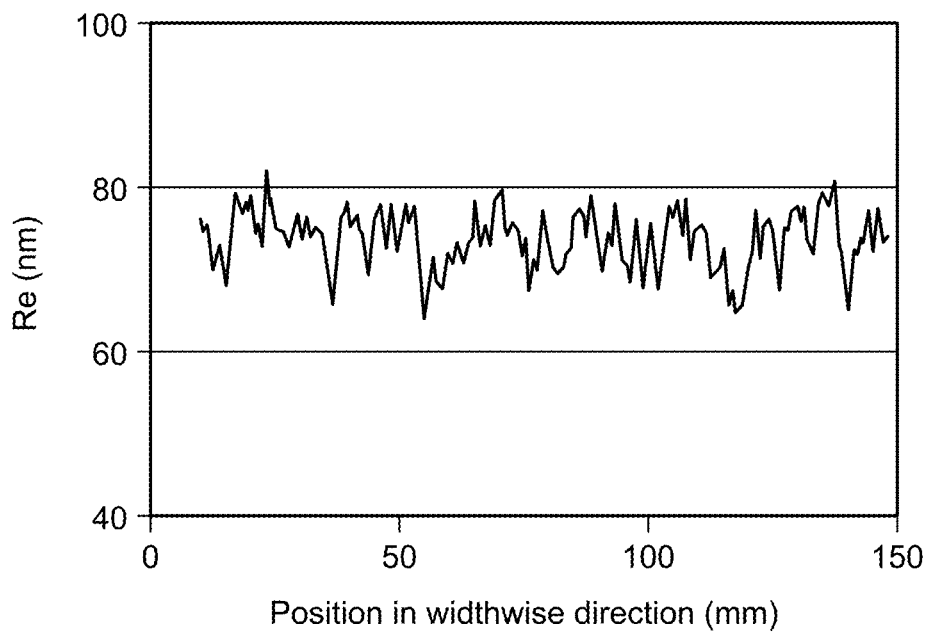
FIG. 11 is a view, which is represented as a graph, illustrating the retardation at points on a line parallel to the widthwise direction of the retardation layer measured in Comparative Example 3.
Figure 12:
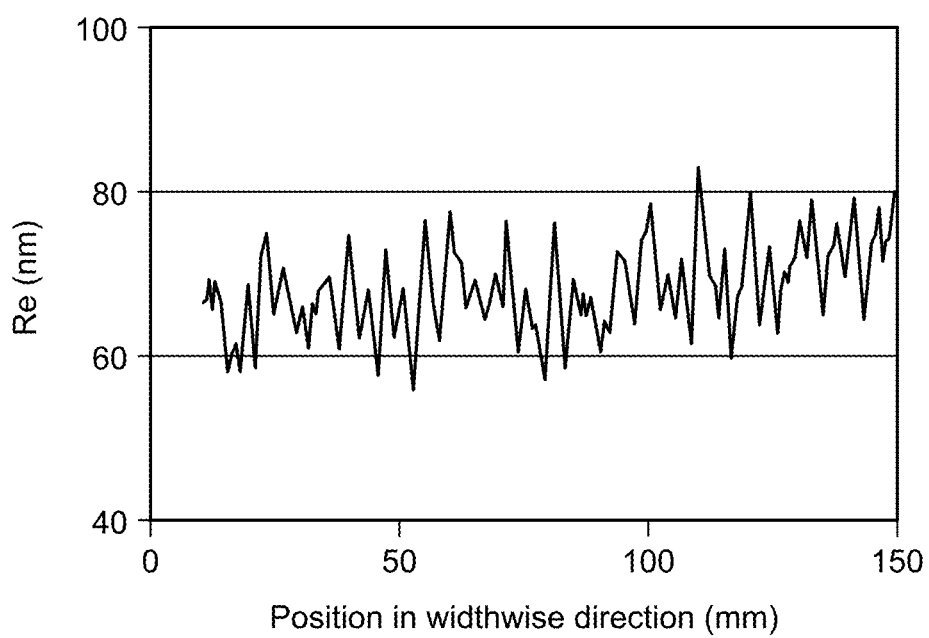
FIG. 12 is a view, which is represented as a graph, illustrating the retardation at points on a line parallel to the widthwise direction of the retardation layer measured in Comparative Example 5.
Figure 13:
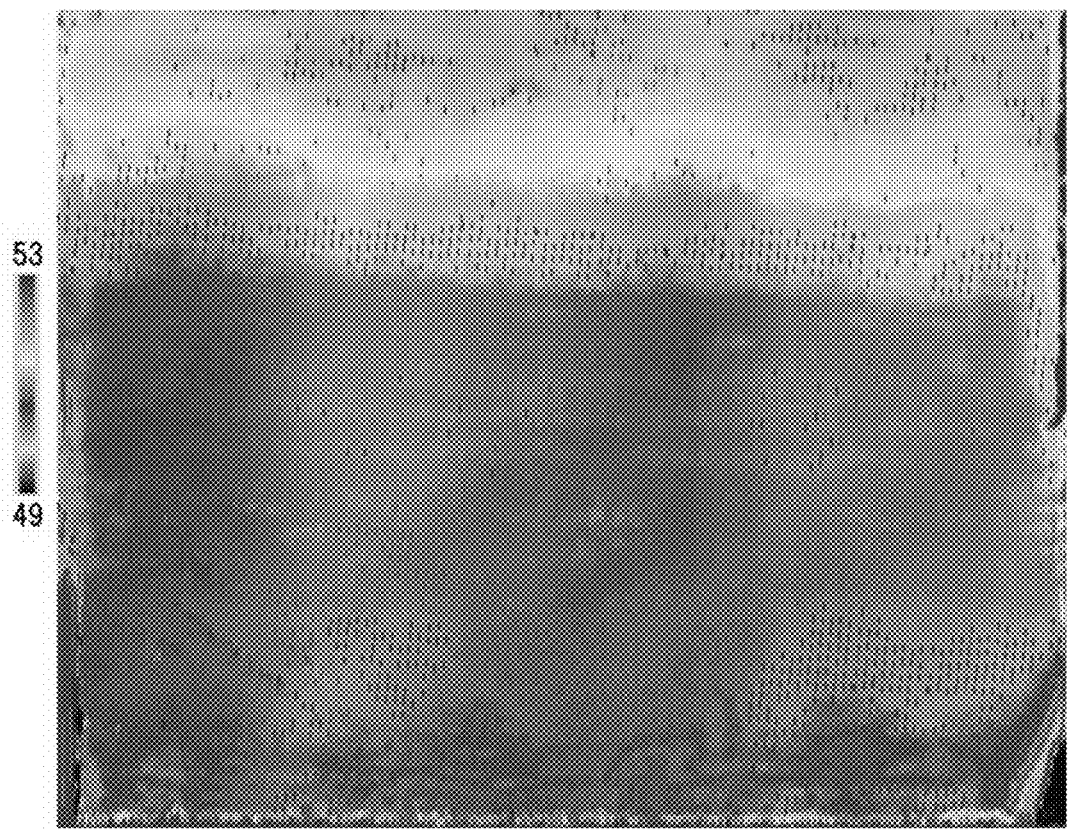
FIG. 13 is a view, which is represented as a mapping, showing a thickness measured in Example 2 of the present invention.
Figure 14:
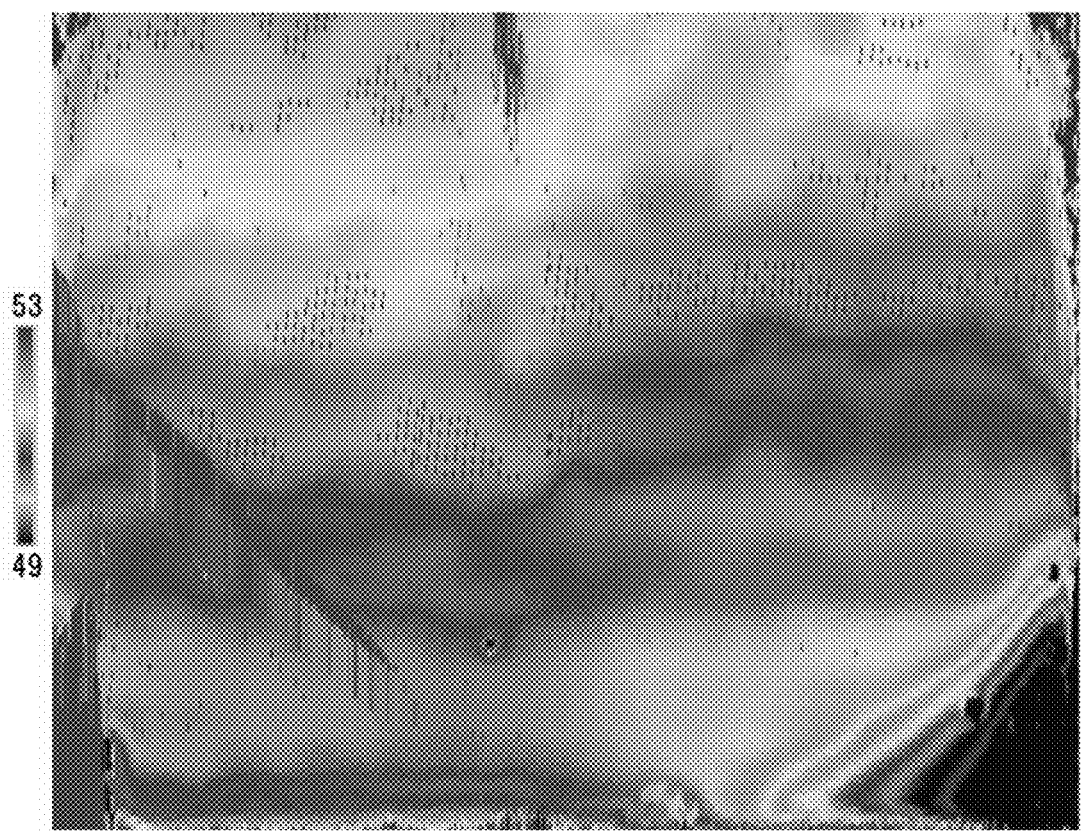
FIG. 14 is a view, which is represented as a mapping, showing a thickness measured in Example 5 of the present invention.
Figure 15:
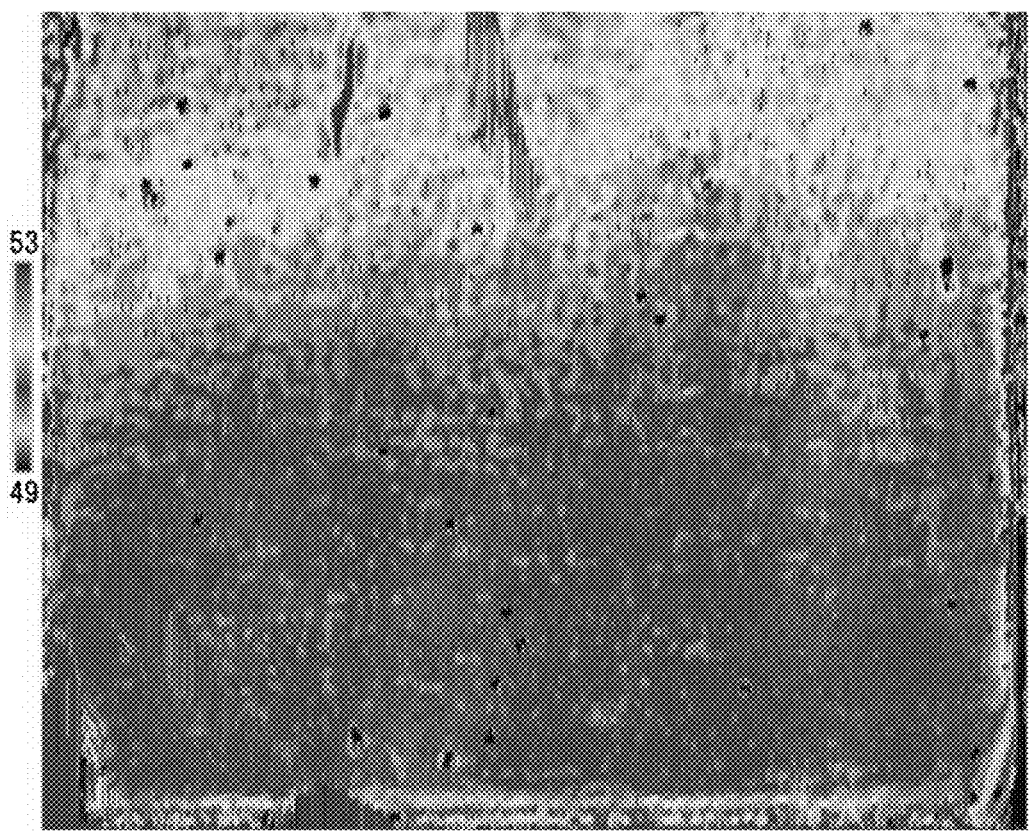
FIG. 15 is a view, which is represented as a mapping, showing a thickness measured in Comparative Example 3.
Figure 16:
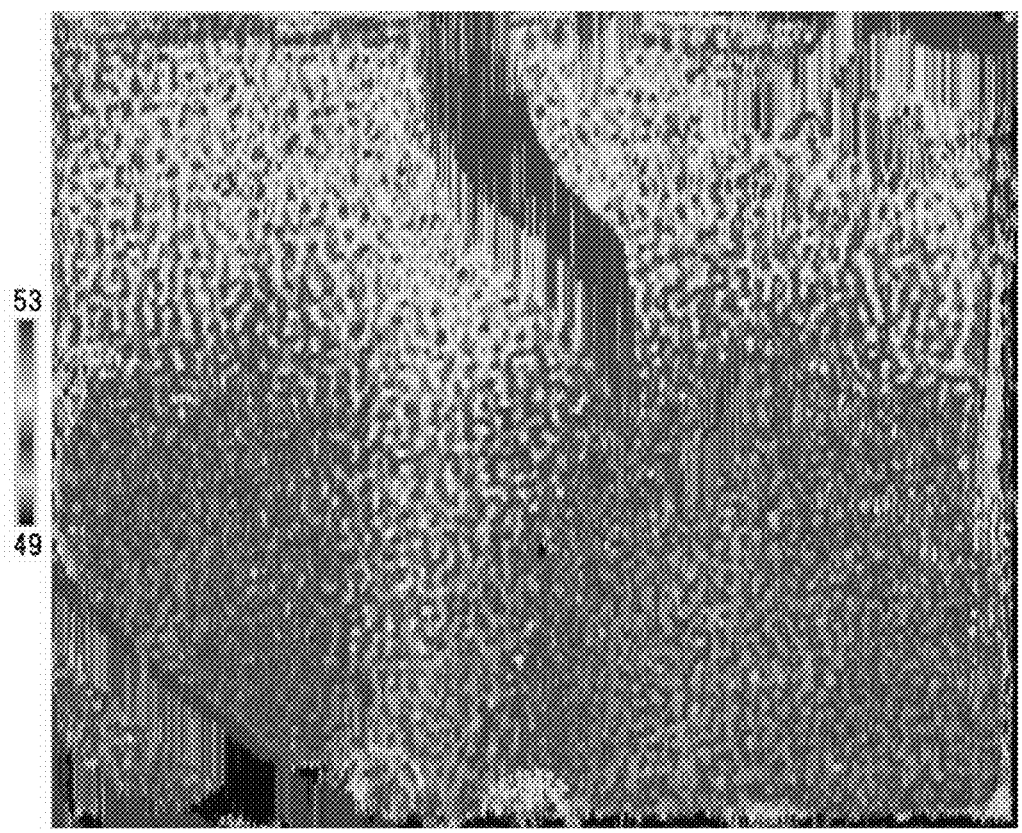
FIG. 16 is a view, which is represented as a mapping, showing a thickness measured in Comparative Example 5.
Figure 17:
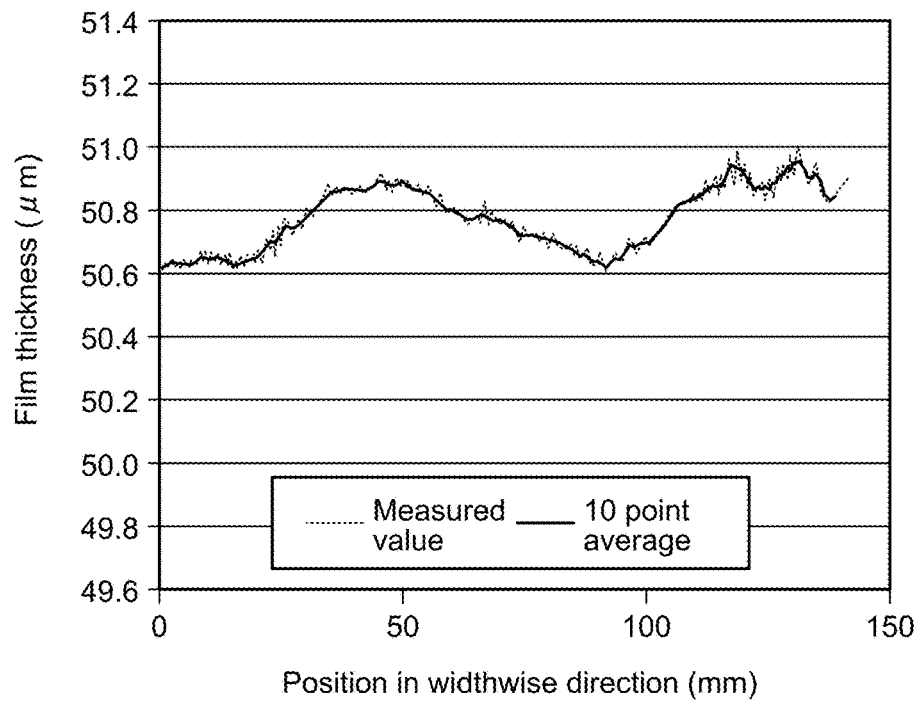
FIG. 17 is a view, which is represented as a graph, illustrating the thickness at points on a line parallel to the widthwise direction of the retardation layer measured in Example 2 of the present invention.
Figure 18:
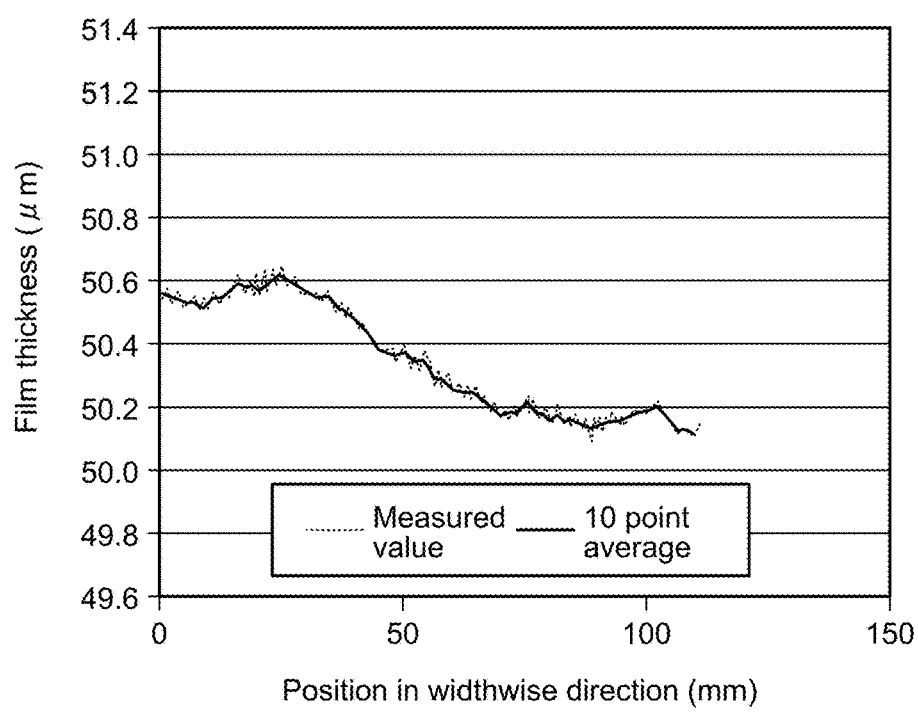
FIG. 18 is a view, which is represented as a graph, illustrating the thickness at points on a line parallel to the widthwise direction of the retardation layer measured in Example 5 of the present invention.
Figure 19:
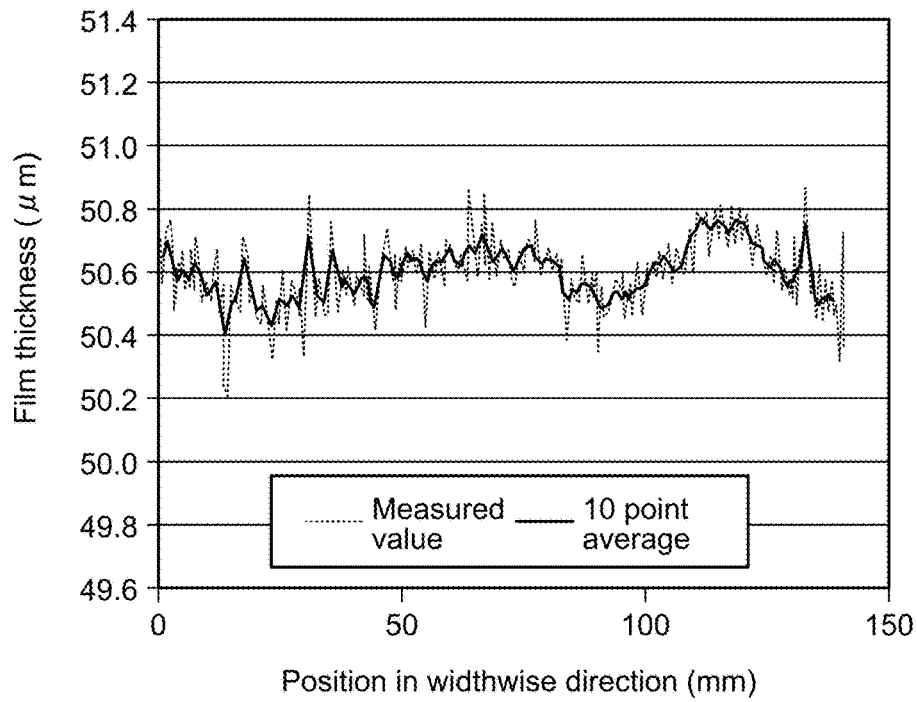
FIG. 19 is a view, which is represented as a graph, illustrating the thickness at points on a line parallel to the widthwise direction of the retardation layer measured in Comparative Example 3.
Figure 20:
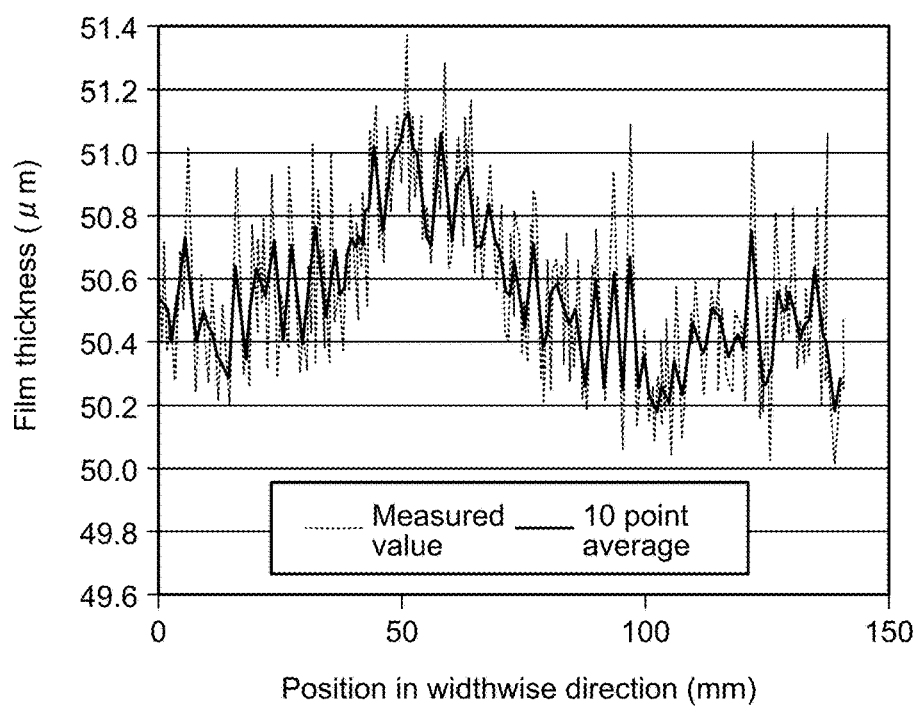
FIG. 20 is a view, which is represented as a graph, illustrating the thickness at points on a line parallel to the widthwise direction of the retardation layer measured in Comparative Example 5.

Hereinafter, the present invention will be described in detail with reference to examples and embodiments. However, the present invention is not limited to the following examples and embodiments and may be freely modified and practiced without departing from the scope of claims of the present invention and the scope of their equivalents.

Unless otherwise specified, a direction of an element that is "parallel" and "perpendicular" in the following description may include an error within a range that does not impair the effects of the present invention, for example, within a range of ±5°, preferably ±3°, and more preferably ±1°.

Unless otherwise specified, a retardation of a layer in the following description represents an in-plane retardation Re. Unless otherwise specified, the in-plane retardation Re is a value represented by Re=(nx−ny)×d. Herein, nx represents a refractive index in a direction that is perpendicular to the thickness direction of the layer (in-plane direction) and gives the largest refractive index, ny represents a refractive index in a direction that is the in-plane direction of the layer and is orthogonal to the direction of nx, and d represents a thickness of the layer. Unless otherwise specified, a measurement wavelength of a retardation is 550 nm.

Unless otherwise specified, "polarizing plate" and "wave plate" in the following description are used as terms including a film and a sheet that have flexibility, such as a resin film.

[1. Liquid Crystal Composition]

The liquid crystal composition of the present invention comprises a polymerizable liquid crystal compound that is capable of expressing birefringence with inverse wavelength dispersion, a surfactant containing a fluorine atom, and a solvent. In the following description, the polymerizable liquid crystal compound that is capable of expressing birefringence with inverse wavelength dispersion may be referred to as "polymerizable liquid crystal compound with inverse wavelength dispersion" as appropriate. The liquid crystal composition of the present invention is not limited to whether in a form of a powder or liquid at normal temperature. However, the liquid crystal composition is usually a fluid composition in a temperature region at which an orientation treatment is performed (usually 50° C. to 150° C.).

[1.1. Polymerizable Liquid Crystal Compound]

The polymerizable liquid crystal compound with inverse wavelength dispersion has liquid crystallinity. Therefore, when the polymerizable liquid crystal compound with inverse wavelength dispersion is oriented, the compound can exhibit a liquid crystal phase. The polymerizable liquid crystal compound with inverse wavelength dispersion has polymerizability. Therefore, when the polymerizable liquid crystal compound is polymerized in a state of exhibiting the liquid crystal phase as described above, a polymer in which orientation of molecules in the liquid crystal phase is maintained can be obtained. Since the liquid crystal composition of the present invention includes the polymerizable liquid crystal compound with inverse wavelength dispersion as described above, a retardation layer can be produced using the liquid crystal composition of the present invention.

Further, the polymerizable liquid crystal compound with inverse wavelength dispersion is a compound that is capable of expressing birefringence with inverse wavelength dispersion. Herein, the compound that is capable of expressing birefringence with inverse wavelength dispersion refers to a compound the polymer of which obtained by the polymerization in the aforementioned manner expresses birefringence with inverse wavelength dispersion.

The birefringence with inverse wavelength dispersion refers to a birefringence in which a birefringence $\Delta n(450)$ at a wavelength of 450 nm and a birefringence $\Delta n(650)$ at a wavelength of 650 nm satisfy the following equation (1). The polymerizable liquid crystal compound with inverse wavelength dispersion that is capable of expressing such birefringence with inverse wavelength dispersion is usually capable of expressing larger birefringence as the measurement wavelength is longer. Therefore, the birefringence of the polymer obtained by polymerization of the polymerizable liquid crystal compound with inverse wavelength dispersion as described above usually satisfies the following equation (2). In the following equation (2), $\Delta n(550)$ represents a birefringence at a measurement wavelength of 550 nm.

$$\Delta n(450) < \Delta n(650) \tag{1}$$

$$\Delta n(450) < \Delta n(550) < \Delta n(650) \tag{2}$$

As the polymerizable liquid crystal compound with inverse wavelength dispersion, for example, a compound having a main chain mesogen and a side chain mesogen bonded to the main chain mesogen in the molecule of the polymerizable liquid crystal compound with inverse wavelength dispersion may be used. In a state where the polymerizable liquid crystal compound with reverse wavelength dispersion including the main chain mesogen and the side chain mesogen is oriented, the side chain mesogen is capable of being oriented in a direction different from that of the main chain mesogen. Therefore, the main chain mesogen and the side chain mesogen is capable of being oriented in different directions in the polymer obtained by polymerizing the polymerizable liquid crystal compound with inverse wavelength dispersion while such orientation is maintained. As a result of this orientation, the aforementioned polymer can express birefringence with inverse wavelength dispersion.

The molecular weight of the polymerizable liquid crystal compound with inverse wavelength dispersion is preferably 300 or more, more preferably 700 or more, and particularly preferably 1,000 or more, and is preferably 2,000 or less, more preferably 1,700 or less, and particularly preferably 1,500 or less. When the aforementioned molecular weight of the polymerizable liquid crystal compound with inverse wavelength dispersion, the polymerizable liquid crystal compound with inverse wavelength dispersion is a monomer. When the polymerizable liquid crystal compound with inverse wavelength dispersion that is not a polymer but a monomer is used, the applying property of the liquid crystal composition can be especially made favorable.

Specific examples of preferable polymerizable liquid crystal compounds with inverse wavelength dispersion may include a compound represented by the following formula (I). In the following description, the compound represented by the formula (I) may be appropriately referred to as "compound (I)".

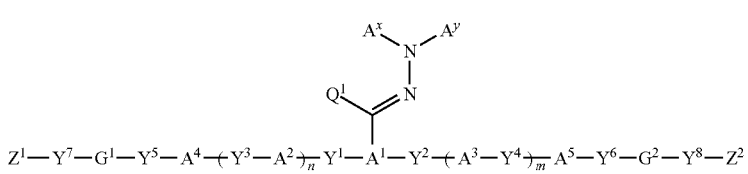

Figure 21:
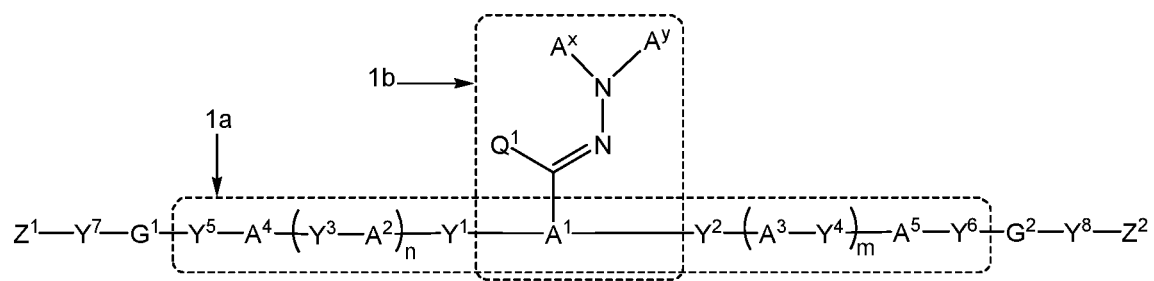
FIG. 21 is a view showing the formula (I) which represents an example of a polymerizable liquid crystal compound capable of expressing birefringence with inverse wavelength dispersion.

As shown in FIG. 21, the compound (I) usually includes two mesogen skeletons including a main chain mesogen 1a composed of a group —Y$^5$-A$^4$-(Y$^3$-A$^2$)$_n$-Y$^1$-A$^1$-Y$^2$-(A$^3$-Y$^4$)$_m$-A$^5$-Y$_6$— and a side chain mesogen 1b composed of a group >A$^1$-C(Q$^1$)=N—N(A$^x$)A$^y$. The main chain mesogen 1a and the side chain mesogen 1b cross each other. The aforementioned main chain mesogen 1a and side chain mesogen 1b may be collectively regarded as one mesogen, but in the present invention, are described as two separate mesogens.

The refractive index of the main chain mesogen 1a in the long-axis direction is denoted by n1, and the refractive index of the side chain mesogen 1b in the long-axis direction is denoted by n2. In this case, the absolute value and wavelength dispersion of the refractive index n1 usually depend on the molecular structure of the main chain mesogen 1a. The absolute value and wavelength dispersion of the refractive index n2 usually depend on the molecular structure of the side chain mesogen 1b. Herein, the polymerizable liquid crystal compound with inverse wavelength dispersion is usually subjected to rotational motion around the long-axis direction of the main chain mesogen 1a as a rotational axis in the liquid crystal phase. Therefore, the refractive indices n1 and n2 herein represent the refractive index of a rotating body.

Due to the molecular structures of the main chain mesogen 1a and the side chain mesogen 1b, the absolute value of the refractive index n1 is larger than the absolute value of the refractive index n2. Further, the refractive indices n1 and n2 usually exhibit forward wavelength dispersion. A refractive index with forward wavelength dispersion herein means a refractive index of which the absolute value becomes smaller as the measurement wavelength is longer. The refractive index n1 of the main chain mesogen 1a exhibits small forward wavelength dispersion. Therefore, the refractive index measured at a long wavelength is not at a level that is extremely smaller than the refractive index measured at a short wavelength. In contrast, the refractive index n2 of the side chain mesogen 1b exhibits large forward wavelength dispersion. Therefore, the refractive index measured at a long wavelength is extremely smaller than the refractive index measured at a short wavelength. Consequently, the difference Δn between the refractive index n1 and the refractive index n2 is small at the short measurement wavelength, and the difference Δn between the refractive index n1 and the refractive index n2 is large at the long measurement wavelength. Accordingly, the ratio of birefringence with inverse wavelength dispersion can be expressed on the basis of the main chain mesogen 1a and the side chain mesogen 1b.

In the formula (I) mentioned above, Y$^1$ to Y$^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—.

Herein, R$^1$ is a hydrogen atom or an alkyl group of 1 to 6 carbon atoms.

Examples of the alkyl group of 1 to 6 carbon atoms of R$^1$ may include a methyl group, an ethyl group, a n-propyl group, an isopropyl group, a n-butyl group, a sec-butyl group, a t-butyl group, a n-pentyl group, and a n-hexyl group.

It is preferable that R$^1$ is a hydrogen atom or an alkyl group of 1 to 4 carbon atoms.

In the compound (I), it is preferable that Y$^1$ to Y$^8$ are each independently a chemical single bond, —O—, —O—C(=O)—, —C(=O)—O—, or —O—C(=O)—O—.

In the formula (I) mentioned above, G$^1$ and G$^2$ are each independently a divalent aliphatic group of 1 to 20 carbon atoms optionally having a substituent.

Examples of the divalent aliphatic group of 1 to 20 carbon atoms may include a divalent aliphatic group having a linear structure, such as an alkylene group of 1 to 20 carbon atoms and an alkenylene group of 2 to 20 carbon atoms; and a divalent aliphatic group, such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent in the divalent aliphatic group of G$^1$ and G$^2$ may include a halogen atom, such as a fluorine atom, a chlorine atom, a bromine atom, and an iodine atom; and an alkoxy group of 1 to 6 carbon atoms, such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aforementioned aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein. However, cases where two or more —O— or —S— are adjacently inserted are excluded. Herein, R$^2$ is a hydrogen atom or an alkyl group of 1 to 6 carbon atoms. It is preferable that R$^2$ is a hydrogen atom or a methyl group.

It is preferable that the group inserted into the aliphatic groups is —O—, —O—C(=O)—, —C(=O)—O—, or —C(=O)—.

Specific examples of the aliphatic groups into which the group is inserted may include —CH$_2$—CH$_2$—O—CH$_2$—CH$_2$—, —CH$_2$—CH$_2$—S—CH$_2$—CH$_2$—, —CH$_2$—CH$_2$—O—C(=O)—CH$_2$—CH$_2$—, —CH$_2$—CH$_2$—C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^2$—C(=O)—CH$_2$—CH$_2$—, —CH$_2$—CH$_2$—C(=O)—NR$^2$—CH$_2$—, —CH$_2$—NR$^2$—CH$_2$—CH$_2$—, and —CH$_2$—C(=O)—CH$_2$—.

Among these, from the viewpoint of more favorably expressing the desired effect of the present invention, G$^1$ and G$^2$ are each independently preferably a divalent aliphatic group having a linear structure, such as an alkylene group of 1 to 20 carbon atoms and an alkenylene group of 2 to 20 carbon atoms, more preferably an alkylene group of 1 to 12 carbon atoms, such as a methylene group, an ethylene group, a trimethylene group, a propylene group, a tetramethylene group, a pentamethylene group, a hexamethylene group, an octamethylene group, and a decamethylene group [—(CH$_2$)$_{10}$—], and particularly preferably a tetramethylene group [—(CH$_2$)$_4$—], a hexamethylene group [—(CH$_2$)$_6$—], an octamethylene group [—(CH$_2$)$_8$—], or a decamethylene group [—(CH$_2$)$_{10}$—].

In the formula (I) mentioned above, $Z^1$ and $Z^2$ are each independently an alkenyl group of 2 to 10 carbon atoms that may be substituted by a halogen atom.

It is preferable that the number of carbon atoms in the alkenyl group is 2 to 6. Examples of the halogen atom that is a substituent in the alkenyl group of $Z^1$ and $Z^2$ may include a fluorine atom, a chlorine atom, and a bromine atom. A chlorine atom is preferable.

Specific examples of the alkenyl group of 2 to 10 carbon atoms of $Z^1$ and $Z^2$ may include CH$_2$=CH—, CH$_2$=C(CH$_3$)—, CH$_2$=CH—CH$_2$—, CH$_3$—CH=CH—, CH$_2$=CH$_2$—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, and CH$_3$—CH=CH—CH$_2$—.

Among these, from the viewpoint of favorably expressing the desired effect of the present invention, $Z^1$ and $Z^2$ are each independently preferably CH$_2$=CH—, CH$_2$=C(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$—, more preferably CH$_2$=CH—, CH$_2$=C(CH$_3$)— or CH$_2$=C(Cl)—, and particularly preferably CH$_2$=CH—.

In the formula (I) mentioned above, $A^x$ is an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2) π electrons, and a cyclic structure that exhibits aromaticity by involving a lone pair of electrons of a heteroatom, such as sulfur, oxygen, and nitrogen, in a π electron system, typified by thiophene, furan, and benzothiazole.

The organic group of 2 to 30 carbon atoms having at least one aromatic ring selected from the group consisting of an aromatic hydrocarbon ring and an aromatic heterocyclic ring, of $A^x$, may have a plurality of aromatic rings, or have both an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring, such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a fused aromatic heterocyclic ring, such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring of $A^x$ may have a substituent. Examples of the substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^5$; —C(=O)—OR$^5$; and —SO$_2$R$^6$. Herein, R$^5$ is an alkyl group of 1 to 20 carbon atoms, an alkenyl group of 2 to 20 carbon atoms, or a cycloalkyl group of 3 to 12 carbon atoms. R$^6$ is an alkyl group of 1 to 20 carbon atoms, an alkenyl group of 2 to 20 carbon atoms, a phenyl group, or a 4-methylphenyl group, which are the same as those for R$^4$ which will be described later.

The aromatic ring of $A^x$ may have a plurality of substituents that may be the same or different, and two adjacent substituents may be bonded together to form a ring. The formed ring may be a monocycle or a fused polycycle, and may be an unsaturated ring or a saturated ring.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

Examples of the organic group of 2 to 30 carbon atoms having at least one aromatic ring selected from the group consisting of an aromatic hydrocarbon ring and an aromatic heterocyclic ring, of $A^x$, may include an aromatic hydrocarbon ring group; an aromatic heterocyclic group; an alkyl group of 3 to 30 carbon atoms having at least one aromatic ring selected from the group consisting of an aromatic hydrocarbon ring and an aromatic heterocyclic ring; an alkenyl group of 4 to 30 carbon atoms having at least one aromatic ring selected from the group consisting of an aromatic hydrocarbon ring and an aromatic heterocyclic ring; and an alkynyl group of 4 to 30 carbon atoms having at least one aromatic ring selected from the group consisting of an aromatic hydrocarbon ring and an aromatic heterocyclic ring.

Preferable specific examples of $A^x$ are as follows. However, $A^x$ is not limited to the following examples. In the following formulae, "-" represents an atomic bonding at any position of the ring (the same applies to the following).

(1) An aromatic hydrocarbon ring group

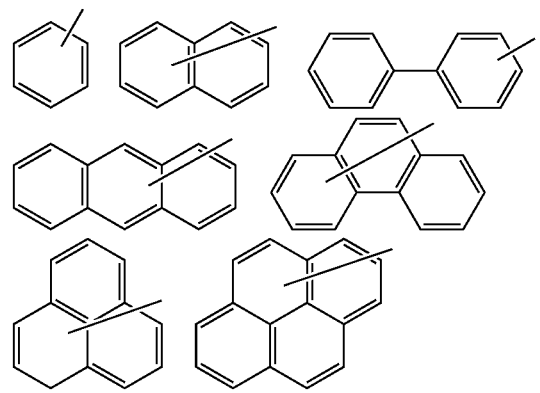

-continued

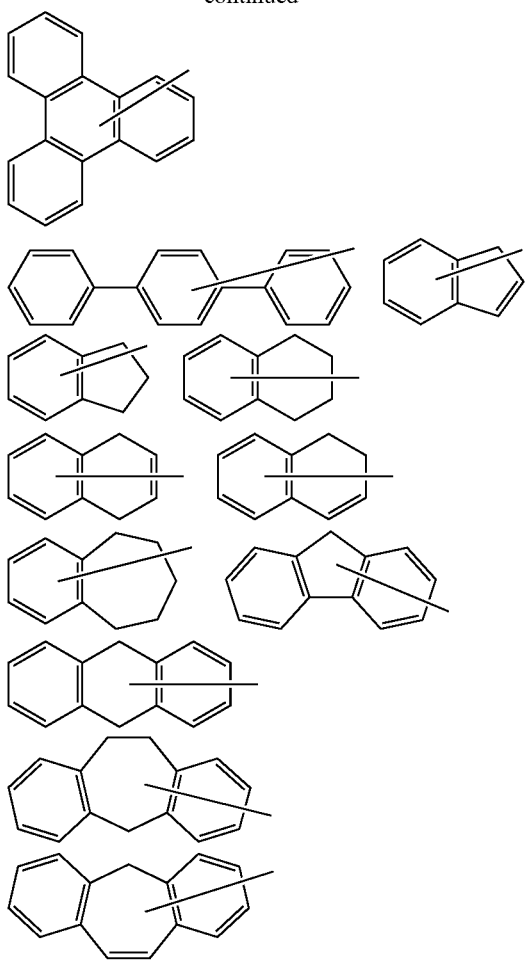

(2) An aromatic heterocyclic group

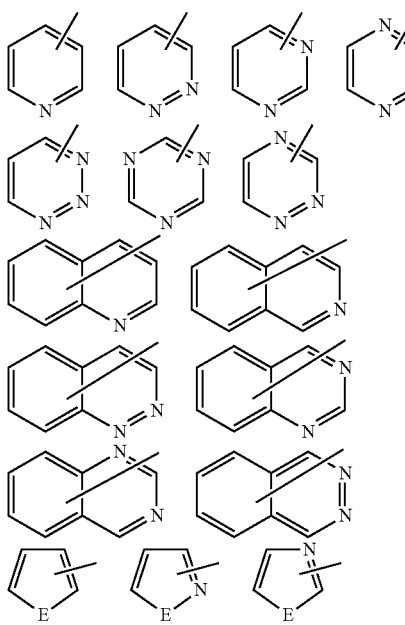

In the aforementioned formulae, E is $NR^{6a}$, an oxygen atom, or a sulfur atom. Herein, $R^{6a}$ is a hydrogen atom; or an alkyl group of 1 to 6 carbon atoms, such as a methyl group, an ethyl group, and a propyl group.

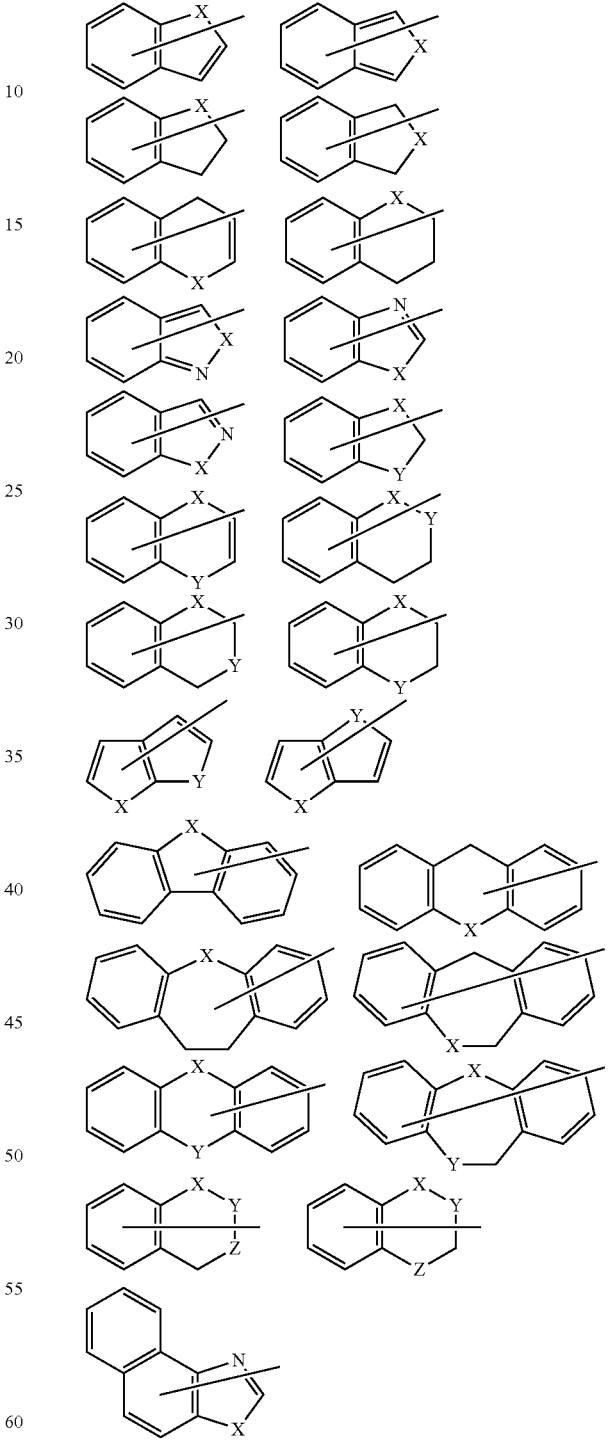

In the aforementioned formulae, X, Y, and Z are each independently $NR^7$, an oxygen atom, a sulfur atom, —SO—, or —SO$_2$— (provided that cases where an oxygen atom, a sulfur atom, —SO—, and —SO$_2$— are each adjacent are excluded). $R^7$ is a hydrogen atom, or an alkyl group of 1 to 6 carbon atoms, such as a methyl group, an ethyl group, and a propyl group, which are the same as those for $R^{6a}$ described above.

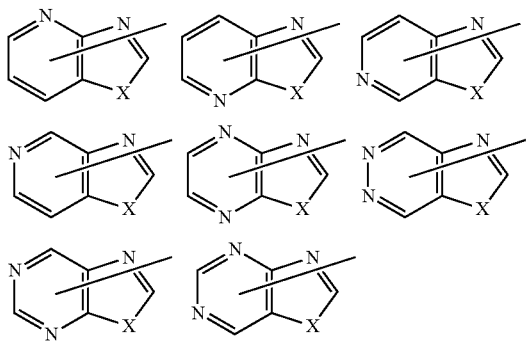

(In the aforementioned formulae, X has the same meanings as described above.)

(3) An alkyl group having at least one aromatic ring selected from the group consisting of an aromatic hydrocarbon ring and an aromatic heterocyclic ring

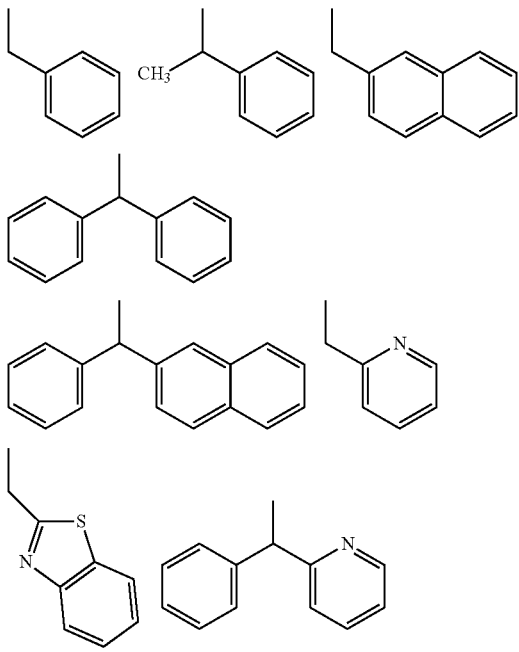

(4) An alkenyl group having at least one aromatic ring selected from the group consisting of an aromatic hydrocarbon ring and an aromatic heterocyclic ring

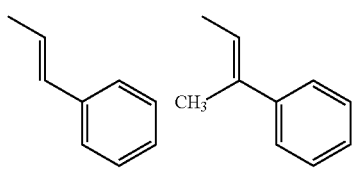

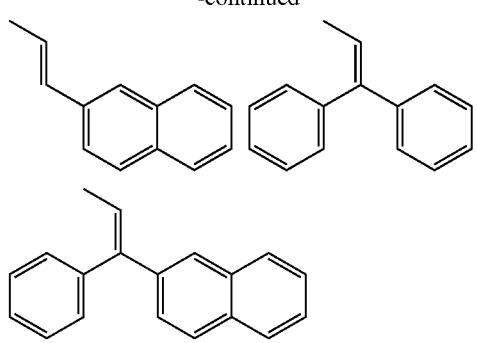

(5) An alkynyl group having at least one aromatic ring selected from the group consisting of an aromatic hydrocarbon ring and an aromatic heterocyclic ring

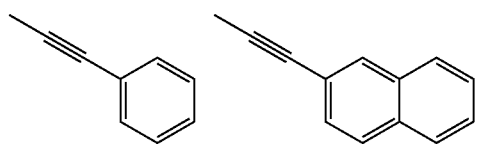

Of $A^x$ described above, an aromatic hydrocarbon ring group of 6 to 30 carbon atoms and an aromatic heterocyclic group of 4 to 30 carbon atoms are preferable, and any of the groups shown below are more preferable.

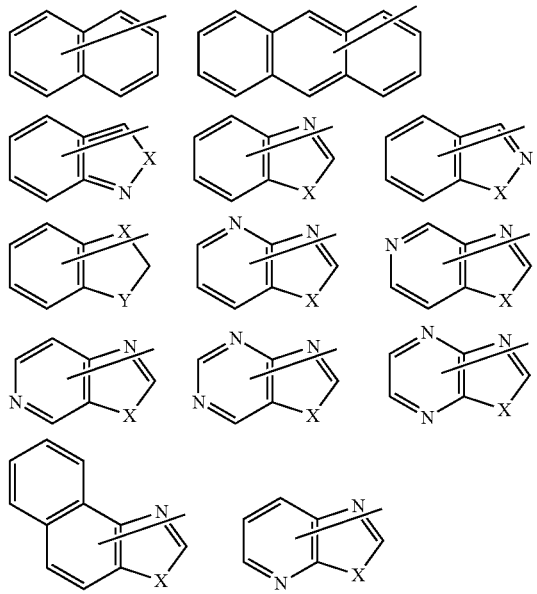

It is further preferable that $A^x$ is any of the following groups.

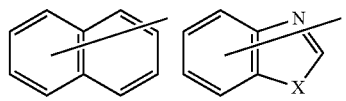

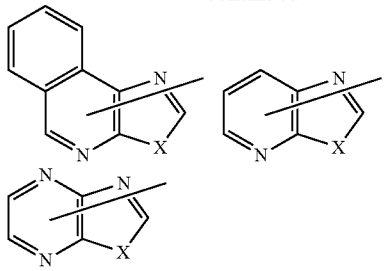

The ring that $A^x$ has may have a substituent. Examples of such a substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^8$; —C(=O)—OR$^8$; and —SO$_2$R$^6$. Herein, R$^8$ is an alkyl group of 1 to 6 carbon atoms, such as a methyl group and an ethyl group; or an aryl group of 6 to 14 carbon atoms, such as a phenyl group. In particular, it is preferable that the substituent is a halogen atom, a cyano group, an alkyl group of 1 to 6 carbon atoms, or an alkoxy group of 1 to 6 carbon atoms.

The ring that $A^x$ has may have a plurality of substituents that may be the same or different, and two adjacent substituents may be bonded together to form a ring. The formed ring may be a monocycle or a fused polycycle.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

In the aforementioned formula (I), $A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring. Herein, R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. R$^4$ is an alkyl group of 1 to 20 carbon atoms, an alkenyl group of 2 to 20 carbon atoms, a phenyl group, or a 4-methylphenyl group. R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent, of $A^y$, may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group of 1 to 20 carbon atoms optionally having a substituent is preferably 1 to 12, and further preferably 4 to 10.

Examples of the alkenyl group of 2 to 20 carbon atoms in the alkenyl group of 2 to 20 carbon atoms optionally having a substituent, of $A^y$, may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group. The number of carbon atoms in the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent, of $A^y$, may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent, of $A^y$, may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituents in the alkyl group of 1 to 20 carbon atoms optionally having a substituent and the alkenyl group of 2 to 20 carbon atoms optionally having a substituent, of $A^y$, may include a halogen atom, such as a fluorine atom and a chlorine atom; a cyano group; a substituted amino group, such as a dimethylamino group; an alkoxy group of 1 to 20 carbon atoms, such as a methoxy group, an ethoxy group, an isopropyl group, and a butoxy group; an alkoxy group of 1 to 12 carbon atoms that is substituted by an alkoxy group of 1 to 12 carbon atoms, such as a methoxymethoxy group and a methoxyethoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; a cycloalkyloxy group of 3 to 8 carbon atoms, such as a cyclopentyloxy group, and a cyclohexyloxy group; a cyclic ether group of 2 to 12 carbon atoms, such as a tetrahydrofuranyl group, a tetrahydropyranyl group, a dioxolanyl group, and a dioxanyl group; an aryloxy group of 6 to 14 carbon atoms, such as a phenoxy group, and a naphthoxy group; a fluoroalkoxy group of 1 to 12 carbon atoms in which at least one is substituted by a fluoro atom, such as a trifluoromethyl group, a pentafluoroethyl group, and —CH$_2$CF$_3$; a benzofuryl group; a benzopyranyl group; a benzodioxolyl group; a benzodioxanyl group; —C(=O)—R$^7$; —C(=O)—OR$^{7a}$; —SO$_2$R$^{8a}$; —SR$^{10}$; an alkoxy group of 1 to 12 carbon atoms substituted by —SR$^{10}$; and a hydroxyl group. Herein, R$^{7a}$ and R$^{10}$ are each independently an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ is an alkyl group of 1 to 20 carbon atoms, an alkenyl group of 2 to 20 carbon atoms, a phenyl group, or a 4-methylphenyl group, which are the same as those for $R^4$ described above.

Examples of the substituent in the cycloalkyl group of 3 to 12 carbon atoms optionally having a substituent, of $A^y$, may include a halogen atom, such as a fluorine atom and a chlorine atom; a cyano group; a substituted amino group, such as a dimethylamino group; an alkyl group of 1 to 6 carbon atoms, such as a methyl group, an ethyl group, and a propyl group; an alkoxy group of 1 to 6 carbon atoms, such as a methoxy group, an ethoxy group, and an isopropoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; —C(=O)—$R^{7a}$; —C(=O)—$OR^{7a}$; —$SO_2R^{8a}$; and a hydroxyl group. Herein, $R^{7a}$ and $R^{8a}$ have the same meanings as described above.

Examples of the substituent in the alkynyl group of 2 to 20 carbon atoms optionally having a substituent, of $A^y$, may include substituents that are the same as the substituents in the alkyl group of 1 to 20 carbon atoms optionally having a substituent and the alkenyl group of 2 to 20 carbon atoms optionally having a substituent.

In the group represented by —C(=O)—$R^3$ of $A^y$, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$; and the aromatic hydrocarbon ring group of 5 to 12 carbon atoms, among the aromatic hydrocarbon ring groups described in $A^x$ described above.

In the group represented by —$SO_2$—$R^4$ of $A^y$, $R^4$ is an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms, of $R^4$, may include those exemplified as the examples of the alkyl group of 1 to 20 carbon atoms, and the alkenyl group of 2 to 20 carbon atoms, of $A^y$ described above.

In the group represented by —C(=S)NH—$R^9$ of $A^y$, $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$ described above; and the aromatic hydrocarbon ring group of 5 to 20 carbon atoms and aromatic heteroaromatic ring group of 5 to 20 carbon atoms, among the aromatic hydrocarbon ring groups and aromatic heteroaromatic ring groups described in $A^x$ described above.

Examples of the organic group of 2 to 30 carbon atoms having at least one aromatic ring selected from the group consisting of an aromatic hydrocarbon ring and an aromatic heterocyclic ring of $A^y$ may include those exemplified as the examples of $A^x$ described above.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, or an organic group of 2 to 30 carbon atoms having at least one aromatic ring selected from the group consisting of an aromatic hydrocarbon ring and an aromatic heterocyclic ring, and further preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic group of 3 to 9 carbon atoms optionally having a substituent, —C(=O)—$R^3$, or a group represented by —$SO_2$—$R^4$. Herein, $R^3$ and $R^4$ have the same meanings as described above.

It is preferable that substituents in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent, of $A^y$, are a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ has the same meanings as described above.

It is preferable that substituents in the cycloalkyl group of 3 to 12 carbon atoms optionally having a substituent, the aromatic hydrocarbon ring group of 6 to 12 carbon atoms optionally having a substituent, and the aromatic heterocyclic group of 3 to 9 carbon atoms optionally having a substituent, of $A^y$, are a fluorine atom, an alkyl group of 1 to 6 carbon atoms, an alkoxy group of 1 to 6 carbon atoms, or a cyano group.

$A^x$ and $A^y$ may form a ring together. Examples of the ring may include an unsaturated heterocyclic ring of 4 to 30 carbon atoms optionally having a substituent and an unsaturated carbon ring of 6 to 30 carbon atoms optionally having a substituent.

The aforementioned unsaturated heterocyclic ring of 4 to 30 carbon atoms and the aforementioned unsaturated carbon ring of 6 to 30 carbon atoms are not particularly restricted, and may or may not have aromaticity.

Examples of the ring formed by $A^x$ and $A^y$ together may include rings shown below. The rings shown below are a moiety of:

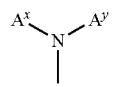

in the formula (I).

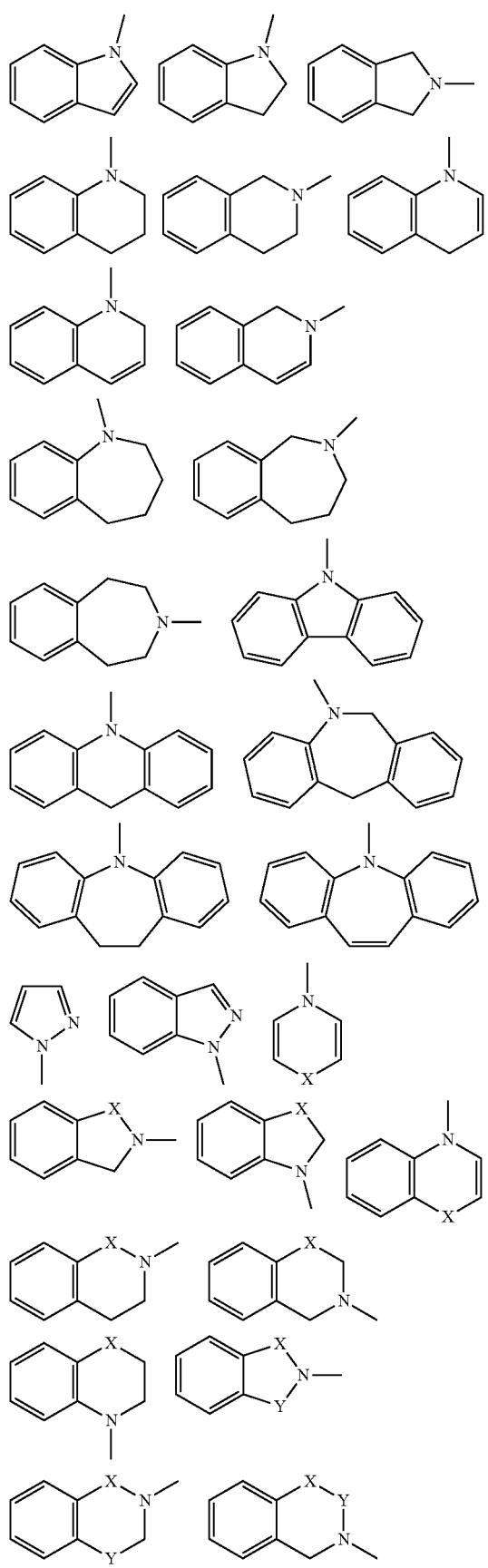
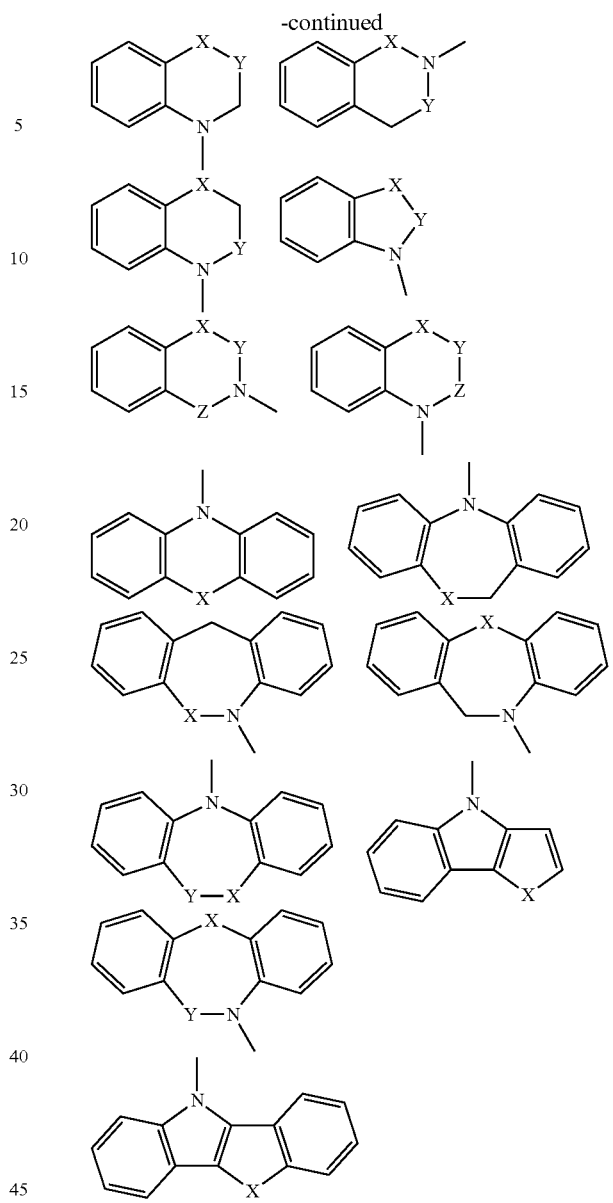

(In the formulae, X, Y, and Z have the same meanings as described above.)

The rings may have a substituent. Examples of the substituent may include those described as the substituent in the aromatic ring of $A^x$.

The total number of π electrons contained in $A^x$ and $A^y$ is preferably 4 or more and 24 or less, more preferably 6 or more and 20 or less, and further preferably 6 or more and 18 or less from the viewpoint of favorably expressing the desired effect of the present invention.

Examples of preferred combination of $A^x$ and $A^y$ may include the following combinations (α) and (β).

(α) a combination of $A^x$ and $A^y$ in which $A^x$ is an aromatic hydrocarbon ring group of 4 to 30 carbon atoms or an aromatic heterocyclic group of 4 to 30 carbon atoms, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$.

(β) a combination of $A^x$ and $A^y$ in which $A^x$ and $A^y$ together form an unsaturated heterocyclic ring or an unsaturated carbon ring. Herein, $R^{10}$ has the same meanings as described above.

Examples of more preferred combination of $A^x$ and $A^y$ may include the following combination (γ).

(γ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$. Herein, $R^{10}$ has the same meanings as described above.

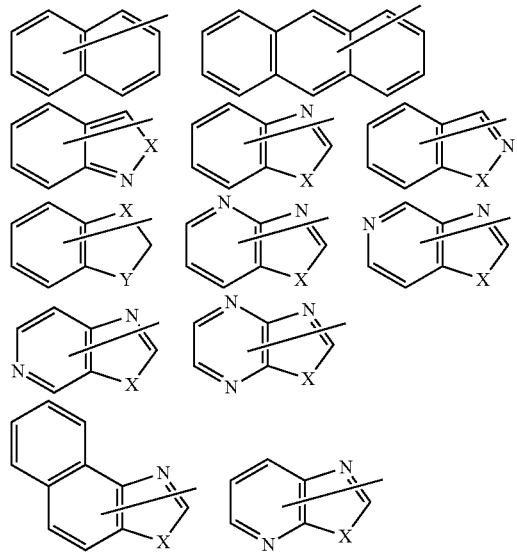

(In the formulae, X and Y have the same meanings as described above.)

Examples of particularly preferred combination of $A^x$ and $A^y$ may include the following combination (δ).

(δ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and —$SR^{10}$. In the following formulae, X has the same meanings as described above. Herein, $R^{10}$ has the same meanings as described above.

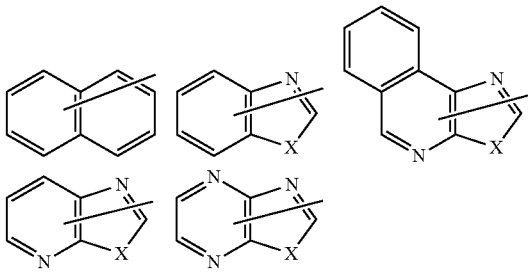

In the formula (I) mentioned above, $A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent aromatic group is preferably the trivalent carbocyclic aromatic group, more preferably a trivalent benzene ring group or a trivalent naphthalene ring group, and further preferably a trivalent benzene ring group or a trivalent naphthalene ring group that is represented by the following formula. In the following formulae, substituents $Y^1$ and $Y^2$ are described for the sake of convenience to clearly show a bonding state ($Y^1$ and $Y^2$ have the same meanings as described above, and the same applies to the following).

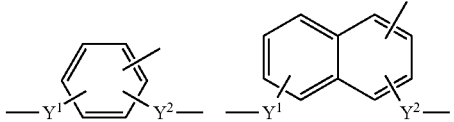

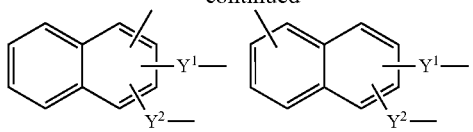

Among these, $A^1$ is more preferably a group represented by each of the following formulae (A11) to (A25), further preferably a group represented by the formula (A11), (A13), (A15), (A19), or (A23), and particularly preferably a group represented by the formula (A11) or (A23).

(A11)

(A12)

(A13)

(A14)

(A15)

(A16)

(A17)

(A18)

(A19)

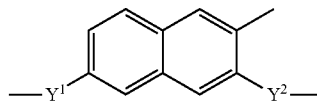
(A20)

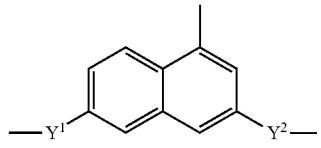
(A21)

(A22)

(A23)

(A24)

(A25)

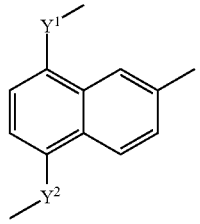
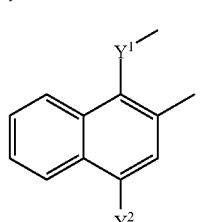
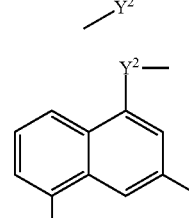
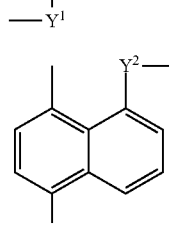
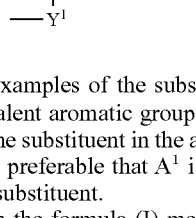
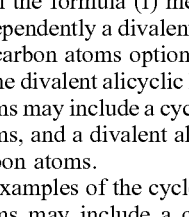

Examples of the substituent that may be included in the trivalent aromatic group of $A^1$ may include those described as the substituent in the aromatic ring of $A^x$ described above. It is preferable that $A^1$ is a trivalent aromatic group having no substituent.

In the formula (I) mentioned above, $A^2$ and $A^3$ are each independently a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms, and a divalent alicyclic fused ring group of 10 to 30 carbon atoms.

Examples of the cycloalkanediyl group of 3 to 30 carbon atoms may include a cyclopropanediyl group; a cyclobutanediyl group, such as a cyclobutane-1,2-diyl group and a cyclobutane-1,3-diyl group; a cyclopentanediyl group, such as a cyclopentane-1,2-diyl group and a cyclopentane-1,3-diyl group; a cyclohexanediyl group, such as a cyclohexane-1,2-diyl group, a cyclohexane-1,3-diyl group, and a cyclohexane-1,4-diyl group; a cycloheptanediyl group, such as a cycloheptane-1,2-diyl group, a cycloheptane-1,3-diyl group, and a cycloheptane-1,4-diyl group; a cyclooctanediyl group, such as a cyclooctane-1,2-diyl group, a cyclooctane-1,3-diyl group, a cyclooctane-1,4-diyl group, and a cyclooctane-1, 5-diyl group; a cyclodecanediyl group, such as a cyclodecane-1,2-diyl group, a cyclodecane-1,3-diyl group, a cyclodecane-1,4-diyl group, and a cyclodecane-1,5-diyl group; a cyclododecanediyl group, such as a cyclododecane-1,2-diyl group, a cyclododecane-1,3-diyl group, a cyclododecane-1, 4-diyl group, and a cyclododecane-1,5-diyl group; a cyclotetradecanediyl group, such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group, such as a cycloeicosane-1,2-diyl group and a cycloeicosane-1,10-diyl group.

Examples of the divalent alicyclic fused ring group of 10 to 30 carbon atoms may include a decalindiyl group, such as a decalin-2,5-diyl group and a decalin-2,7-diyl group; an adamantanediyl group, such as an adamantane-1,2-diyl group and an adamantane-1,3-diyl group; and a bicyclo[2.2.1]heptanediyl group, such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent at any position. Examples of the substituent may include those described as the substituent in the aromatic ring of $A^x$ described above.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by each of the following formulae (A31) to (A34), and particularly preferably the group represented by the following formula (A32).

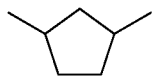

(A31)

(A32)

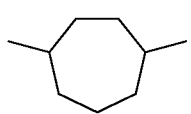

(A33)

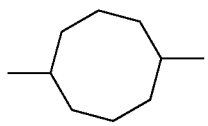

(A34)

The divalent alicyclic hydrocarbon group of 3 to 30 carbon atoms may exist in forms of cis- and trans-stereoisomers that are on the basis of difference of stereoconfiguration of carbon atoms bonded to $Y^1$ and $Y^3$ (or $Y^2$ and $Y^4$). For example, when the group is a cyclohexane-1,4-diyl group, a cis-isomer (A32a) and a trans-isomer (A32b) may exist, as described below.

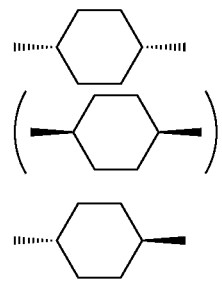

(A32a)

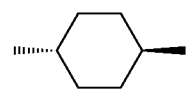

(A32b)

The aforementioned divalent alicyclic hydrocarbon group of 3 to 30 carbon atoms may be a cis-isomer, a trans-isomer, or an isomeric mixture of cis- and trans-isomers. Since the orientation is favorable, the group is preferably the trans-isomer or the cis-isomer, and more preferably the trans-isomer.

In the formula (I) mentioned above, $A^4$ and $A^5$ are each independently a divalent aromatic group of 6 to 30 carbon atoms optionally having a substituent. The aromatic group of $A^4$ and $A^5$ may be monocyclic or polycyclic. Specific preferable examples of $A^4$ and $A^5$ are as follows.

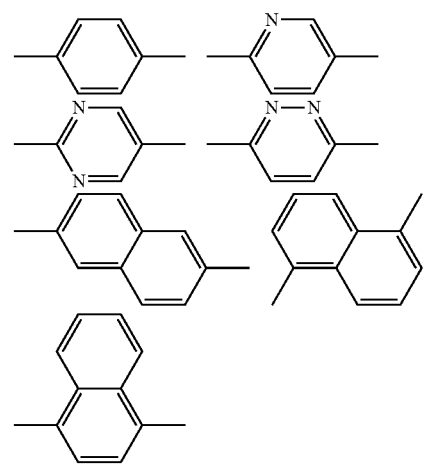

The divalent aromatic groups of $A^4$ and $A^5$ described above may have a substituent at any position. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—OR$^{8b}$ group. Herein, R$^{8b}$ is an alkyl group of 1 to 6 carbon atoms. In particular, it is preferable that the substituent is a halogen atom, an alkyl group of 1 to 6 carbon atoms, or an alkoxy group. Of the halogen atoms, a fluorine atom is more preferable, of the alkyl groups of 1 to 6 carbon atoms, a methyl group, an ethyl group, and a propyl group are more preferable, and of the alkoxy groups, a methoxy group and an ethoxy group are more preferable.

Among these, from the viewpoint of favorably expressing the desired effect of the present invention, $A^4$ and $A^5$ are each independently preferably a group represented by the following formula (A41), (A42), or (A43) and optionally having a substituent, and particularly preferably the group represented by the formula (A41) and optionally having a substituent.

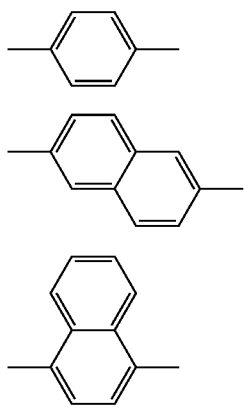

(A41)

(A42)

(A43)

In the formula (I) mentioned above, $Q^1$ is a hydrogen atom or an alkyl group of 1 to 6 carbon atoms optionally having a substituent. Examples of the alkyl group of 1 to 6 carbon atoms optionally having a substituent may include the alkyl group of 1 to 6 carbon atoms among the alkyl groups of 1 to 20 carbon atoms optionally having a substituent that are described as $A^y$ described above. Among these, $Q^1$ is preferably a hydrogen atom or an alkyl group of 1 to 6 carbon atoms, and more preferably a hydrogen atom or a methyl group.

In the formula (I) mentioned above, m and n are each independently 0 or 1. Among these, m is preferably 1, and n is preferably 1.

The compound (I) may be produced, for example, by the following reaction.

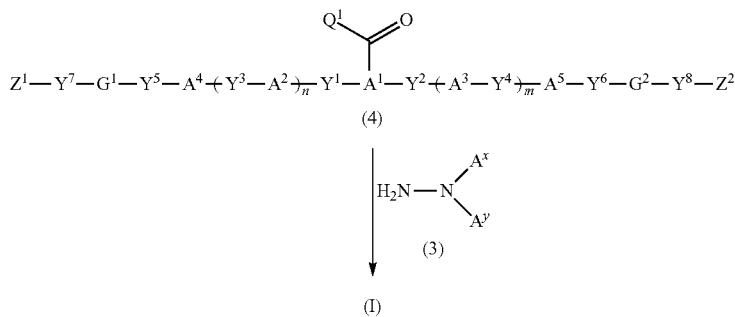

(In the formula, $Y^1$ to $Y^8$, $G^1$, $G^2$, $Z^1$, $Z^2$, $A^x$, $A^y$, $A^1$ to $A^5$, $Q^1$, m, and n have the same meanings as described above.)

As shown in the aforementioned reaction formula, the compound (I) may be produced by a reaction of a hydrazine compound represented by a formula (3) with a carbonyl compound represented by a formula (4). Hereinafter, the hydrazine compound represented by the formula (3) may be referred to as "hydrazine compound (3)" as appropriate. The carbonyl compound represented by the formula (4) may be referred to as "carbonyl compound (4)" as appropriate.

In the aforementioned reaction, the molar ratio of "the hydrazine compound (3):the carbonyl compound (4)" is preferably 1:2 to 2:1, and more preferably 1:1.5 to 1.5:1. When the compounds are reacted at such a molar ratio, the compound (I) as a target can be highly selectively produced in high yield.

In this case, the reaction system may include an acid catalyst including an organic acid, such as (±)-10-camphorsulfonic acid and p-toluene sulfonic acid; and an inorganic acid, such as hydrochloric acid and sulfuric acid. When the acid catalyst is used, the reaction time may be shortened, and the yield may be improved. The amount of the acid catalyst is usually 0.001 mol to 1 mol relative to 1 mol of the carbonyl compound (4). The acid catalyst as it is may be mixed in the reaction system. Alternatively, the acid catalyst to be mixed may be in a solution form in which the acid catalyst is dissolved in an appropriate solution.

As the solvent for use in the reaction, a solvent inert to the reaction may be used. Examples of the solvent may include an alcohol-based solvent, such as methyl alcohol, ethyl alcohol, n-propyl alcohol, isopropyl alcohol, n-butyl alcohol, isobutyl alcohol, sec-butyl alcohol, and t-butyl alcohol; an ether-based solvent, such as diethyl ether, tetrahydrofuran, 1,2-dimethoxyethane, 1,4-dioxane, and cyclopentyl methyl ether; an ester-based solvent, such as ethyl acetate, propyl acetate, and methyl propionate; an aromatic hydrocarbon-based solvent, such as benzene, toluene, and xylene; an aliphatic hydrocarbon-based solvent, such as n-pentane, n-hexane, and n-heptane; an amide-based solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol-based solvent, the ether-based solvent, and a mixed solvent of the alcohol-based solvent and the ether-based solvent are preferable.

The amount of the solvent used is not particularly limited, and may be determined in consideration of type of compound to be used, reaction scale, and the like. The specific amount of the solvent used is usually 1 g to 100 g relative to 1 g of the hydrazine compound (3).

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may be produced as follows.

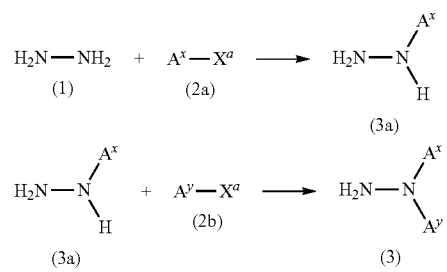

(wherein, $A^x$ and $A^y$ have the same meanings as described above, and $X^a$ is a leaving group, such as a halogen atom, a methanesulfonyloxy group, and a p-toluenesulfonyloxy group.)

As shown in the aforementioned reaction formula, a corresponding hydrazine compound (3a) can be obtained by a reaction of a compound represented by a formula (2a) with hydrazine (1) in an appropriate solvent. In this reaction, the molar ratio of "the compound (2a):the hydrazine (1)" is preferably 1:1 to 1:20, and more preferably 1:2 to 1:10. Further, the hydrazine compound (3a) can be reacted with a compound represented by a formula (2b) to obtain the hydrazine compound (3).

As hydrazine (1), hydrazine monohydrate may be usually used. As hydrazine (1), a commercially available product as it is may be used.

As the solvent for use in this reaction, a solvent inert to the reaction may be used. Examples of the solvent may include an alcohol-based solvent, such as methyl alcohol, ethyl alcohol, n-propyl alcohol, isopropyl alcohol, n-butyl alcohol, isobutyl alcohol, sec-butyl alcohol, and t-butyl alcohol; an ether-based solvent, such as diethyl ether, tetrahydrofuran, 1,2-dimethoxyethane, 1,4-dioxane, and cyclopentyl methyl ether; an aromatic hydrocarbon-based solvent, such as benzene, toluene, and xylene; an aliphatic hydrocarbon-based solvent, such as n-pentane, n-hexane, and n-heptane; an amide-based solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol-based solvent, the ether-based solvent, and a mixed solvent of the alcohol-based solvent and the ether-based solvent are preferable.

The amount of the solvent used is not particularly limited, and may be determined in consideration of type of compound to be used, reaction scale, and the like. For example, the specific amount of the solvent used is usually 1 g to 100 g relative to 1 g of hydrazine.

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may also be produced by reducing a diazonium salt (5) through a known method, as described below.

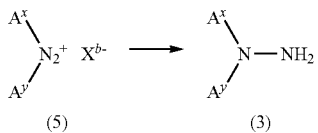

In the formula (5), $A^x$ and $A^y$ have the same meanings as described above, and $X^{b-}$ is an anion that is a counter ion of diazonium. Examples of $X^{b-}$ may include an inorganic anion, such as a hexafluorophosphate ion, a fluoroborate ion, a chloride ion, and a sulfate ion; and an organic anion, such as a polyfluoroalkylcarbonate ion, a polyfluoroalkylsulfonate ion, a tetraphenylborate ion, an aromatic carboxylate ion, and an aromatic sulfonate ion.

Examples of the reducing agent used in the aforementioned reaction may include a metal salt reducing agent. The metal salt reducing agent is generally a compound containing low-valent metal or a compound composed of a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810).

Examples of the metal salt reducing agent may include $NaAlH_4$, $NaAlH_p(Or)_q$ (wherein p and q are each independently an integer of 1 to 3, p+q=4, and r is an alkyl group of 1 to 6 carbon atoms), $LiAlH_4$, $iBu_2AlH$, $LiBH_4$, $NaBH_4$, $SnCl_2$, $CrCl_2$, and $TiCl_3$. Herein, "iBu" represents an isobutyl group.

In the reduction reaction, a known reaction condition may be adopted. For example, the reaction may be performed under conditions described in documents including Japanese Patent Application Laid-Open No. 2005-336103 A, Shin Jikken Kagaku Koza (New course of experimental chemistry), 1978, published by Maruzen Co., Ltd., vol. 14, and Jikken Kagaku Koza (Course of experimental chemistry), 1992, published by Maruzen Co., Ltd., vol. 20.

The diazonium salt (5) may be produced from a compound such as aniline by an ordinary method.

The carbonyl compound (4) may be produced, for example, by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

An ether linkage may be formed as follows.

(i) A compound represented by a formula: D1-hal (hal is a halogen atom, and the same applies to the following) and a compound represented by a formula: D2-OMet (Met is an alkaline metal (mainly sodium), and the same applies to the following) are mixed and condensed (Williamson synthesis). In the formulae, D1 and D2 are an optional organic group (the same applies to the following).

(ii) A compound represented by a formula: D1-hal and a compound represented by a formula: D2-OH are mixed in the presence of a base, such as sodium hydroxide and potassium hydroxide and condensed.

(iii) A compound represented by a formula: D1-J (J is an epoxy group) and a compound represented by a formula: D2-OH are mixed in the presence of a base, such as sodium hydroxide and potassium hydroxide and condensed.

(iv) A compound represented by a formula: D1-OFN (OFN is a group having an unsaturated bond) and a compound represented by a formula: D2-OMet are mixed in the presence of a base, such as sodium hydroxide and potassium hydroxide and subjected to an addition reaction.

(v) A compound represented by a formula: D1-hal and a compound represented by a formula: D2-OMet are mixed in the presence of copper or cuprous chloride and condensed (Ullmann condensation).

An ester linkage and an amide linkage may be formed as follows.

(vi) A compound represented by a formula: D1-COOH and a compound represented by a formula: D2-OH or D2-$NH_2$ are subjected to dehydration condensation in the presence of a dehydration condensation agent (N,N-dicyclohexylcarbodiimide, etc.).

(vii) A compound represented by a formula: D1-COOH is reacted with a halogenating agent to obtain a compound represented by a formula: D1-CO-hal, and the compound is reacted with a compound represented by a formula: D2-OH or D2-$NH_2$ in the presence of a base.

(viii) A compound represented by a formula: D1-COOH is reacted with an acid anhydride to obtain a mixed acid anhydride, and the mixed acid anhydride is reacted with a compound represented by a formula: D2-OH or D2-$NH_2$.

(ix) A compound represented by a formula: D1-COOH and a compound represented by a formula: D2-OH or D2-$NH_2$ are subjected to dehydration condensation in the presence of an acid catalyst or a base catalyst.

More specifically, the carbonyl compound (4) may be produced through a process shown in the following reaction formula.

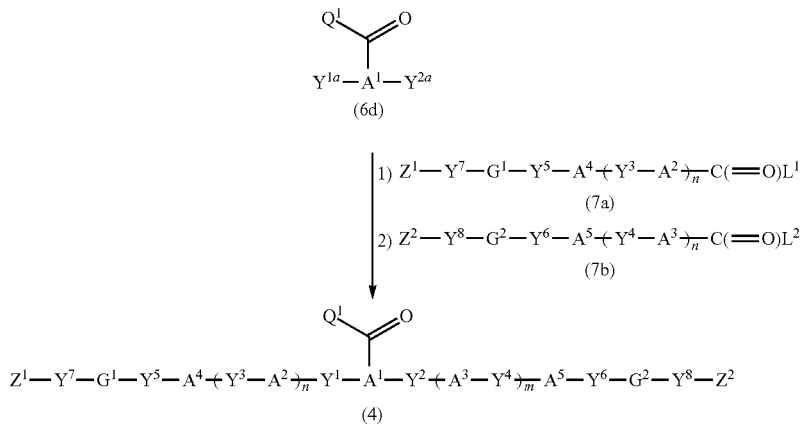

(In the formula, $Y^1$ to $Y^8$, $G^1$, $G^2$, $Z^1$, $Z^2$, $A^1$ to $A^5$, $Q^1$, m, and n have the same meanings as described above; $L^1$ and $L^2$ are each independently a leaving group, such as a hydroxyl group, a halogen atom, a methanesulfonyloxy group, and a p-toluenesulfonyloxy group; $—Y^{1a}$ is a group that is capable of being reacted with -$L^1$ to be $—Y^1—$; and $—Y^{2a}$ is a group that is capable of being reacted with -$L^2$ to be $—Y^2—$.)

As shown in the aforementioned reaction formula, the carbonyl compound (4) may be produced by reacting a compound represented by a formula (6d) with a compound represented by a formula (7a) followed by a compound represented by a formula (7b) by using a reaction of forming an ether linkage ($—O—$), an ester linkage ($—C(=O)—O—$ and $—O—C(=O)—$), or a carbonate linkage ($—O—C(=O)—O—$).

Specifically, a method for producing a compound (4') in which $Y^1$ is a group represented by a formula: $Y^{11}—C(=O)—O—$ and a group represented by a formula: $Z^2—Y^8-G^2-Y^6-A^5-(Y^4-A^3)_m-Y^2—$ is the same as a group represented by a formula: $Z^1—Y^7-G^1-Y^5-A^4-(Y^3-A^2)_n-Y^1—$ is as follows.

As shown in the aforementioned reaction formula, the compound (4') may be produced by a reaction of a dihydroxy compound represented by a formula (6) (compound (6)) with a compound represented by a formula (7) (compound (7)). In the aforementioned reaction, the molar ratio of "the compound (6):the compound (7)" is preferably 1:2 to 1:4, and more preferably 1:2 to 1:3. When the compounds are reacted at such a molar ratio, the compound (4') as a target can be highly selectively produced in high yield.

When the compound (7) is a compound in which $L^1$ is a hydroxyl group (carboxylic acid), the reaction may be performed in the presence of a dehydration condensation agent such as 1-ethyl-3-(3-dimethylaminopropyl)carbodiimide hydrochloride and dicyclohexyl carbodiimide, to obtain a target compound. The amount of the dehydration condensation agent used is usually 1 mol to 3 mol relative to 1 mol of the compound (7).

When the compound (7) is a compound in which $L^1$ is a hydroxyl group (carboxylic acid), the reaction may be performed in the presence of sulfonyl halide such as methanesulfonyl chloride and p-toluenesulfonyl chloride, and a base such as triethylamine, diisopropylethylamine, pyridine,

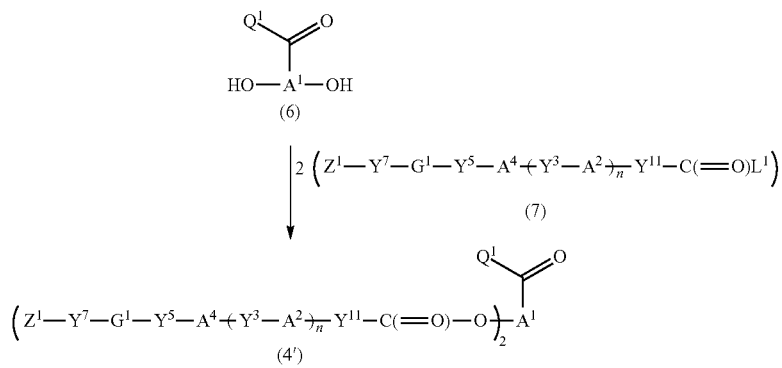

(In the formula, $Y^3$, $Y^5$, $Y^7$, $G^1$, $Z^1$, $A^1$, $A^2$, $A^4$, $Q^1$, n, and L have the same meanings as described above; $Y^{11}$ is a group having a structure with which $Y^{11}—C(=O)—O—$ corresponds to $Y^1$; and $Y^1$ has the same meanings as described above.)

and 4-(dimethylamino)pyridine, to obtain a target compound. The amount of the sulfonyl halide used is usually 1 mol to 3 mol relative to 1 mol of the compound (7). The amount of base used is usually 1 mol to 3 mol relative to 1 mol of the compound (7). In this case, a compound in which $L^1$ in the formula (7) is a sulfonyloxy group (mixed acid anhydride) may be isolated, before performing the subsequent reaction.

When the compound (7) is a compound in which $L^1$ is a halogen atom (acid halide), the reaction may be performed in the presence of a base to obtain a target compound. Examples of the base may include an organic base such as triethylamine and pyridine; and an inorganic base such as sodium hydroxide, sodium carbonate, and sodium hydrogen carbonate. The amount of base used is usually 1 mol to 3 mol relative to 1 mol of the compound (7).

Examples of a solvent for use in the reaction may include a chlorinated solvent, such as chloroform, and methylene chloride; an amide-based solvent, such as N-methylpyrrolidone, N,N-dimethylformamide, N,N-dimethylacetamide, and hexamethylphosphoric triamide; an ether-based solvent, such as 1,4-dioxane, cyclopentyl methyl ether, tetrahydrofuran, tetrahydropyran, and 1,3-dioxolane; a sulfur-containing solvent, such as dimethylsulfoxide, and sulfolane; an aromatic hydrocarbon-based solvent, such as benzene, toluene, and xylene; an aliphatic hydrocarbon-based solvent, such as n-pentane, n-hexane, and n-octane; an alicyclic hydrocarbon-based solvent, such as cyclopentane, and cyclohexane; and a mixed solvent of two or more types thereof.

The amount of the solvent used is not particularly limited, and may be determined in consideration of type of compound to be used, reaction scale, and the like. The specific amount of the solvent used is usually 1 g to 50 g relative to 1 g of the hydroxy compound (6).

Most of compounds (6) are known substances, and may be produced by known methods. For example, the compound (6) may be produced by a process shown in the following reaction formula (see International publication WO2009/042544 and The Journal of Organic Chemistry, 2011, 76, 8082-8087). A product commercially available as the compound (6) may be used with, if desired, purification.

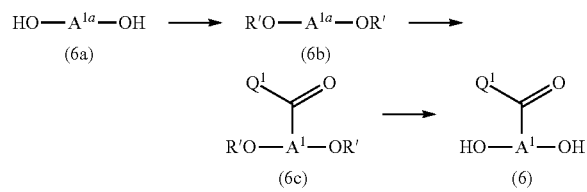

(wherein $A^1$ and $Q^1$ have the same meanings as described above; $A^{1a}$ is a divalent aromatic group that is capable of being formylated or acylated to form $A^1$; and R' is a protecting group of a hydroxyl group, such as an alkyl group of 1 to 6 carbon atoms such as a methyl group and an ethyl group and an alkoxyalkyl group of 2 to 6 carbon atoms such as a methoxymethyl group.)

As shown in the aforementioned reaction formula, a hydroxyl group of a dihydroxy compound represented by a formula (6a) (1,4-dihydroxybenzene, 1,4-dihydroxynaphthalene, etc.) is alkylated to obtain a compound represented by a formula (6b). Subsequently, an ortho position of an OR' group is formylated or acylated by a known method, to obtain a compound represented by a formula (6c). The obtained compound may be subjected to deprotection (dealkylation), to produce the compound (6) as a target.

The product commercially available as the compound (6) as it is may be used or with, if desired, purification.

Most of compounds (7) are known compounds, and may be produced, for example, by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

For example, when the compound (7) is a compound represented by the following formula (7') (compound (7')), the compound (7') may be produced as follows, using a dicarboxylic acid represented by a formula (9') (compound (9')).

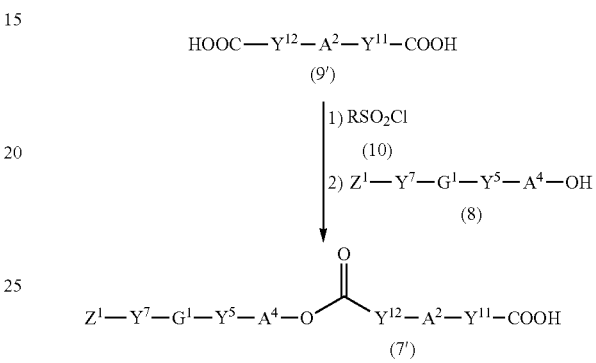

(In the formula, $Y^5$, $Y^7$, $G^1$, Z, $A^2$, $A^4$, and $Y^{11}$ have the same meanings as described above; $Y^{12}$ is a group having a structure with which —O—C(=O)—$Y^{12}$ corresponds to $Y^3$; and R is an alkyl group, such as a methyl group and an ethyl group, or an aryl group optionally having a substituent, such as a phenyl group and a p-methylphenyl group.)

The compound (9') is first reacted with sulfonyl chloride represented by a formula (10) in the presence of a base such as triethylamine or 4-(dimethylamino)pyridine. Subsequently, to the reaction mixture, a compound (8) and a base such as triethylamine or 4-(dimethylamino)pyridine are added to perform a reaction.

The amount of sulfonyl chloride used is usually 0.5 equivalents to 0.7 equivalents relative to 1 equivalent of the compound (9').

The amount of compound (8) used is usually 0.5 equivalents to 0.6 equivalents relative to 1 equivalent of the compound (9').

The amount of base used is usually 0.5 equivalents to 0.7 equivalents relative to 1 equivalent of the compound (9').

The reaction temperature is 20° C. to 30° C., and the reaction time may vary depending on the reaction scale, and the like, and is several minutes to several hours.

Examples of the solvent for use in the aforementioned reaction may include those exemplified as the examples of the solvent that may be used for producing the compound (4'). Among these, an ether solvent is preferable.

The amount of the solvent used is not particularly limited, and may be determined in consideration of type of compound to be used, reaction scale, and the like. For example, the specific amount of the solvent used is usually 1 g to 50 g relative to 1 g of the hydroxy compound (9').

In any of the reactions, a usual post-treatment operation in organic synthesis chemistry may be performed after completion of the reactions. If desired, a known separation and purification method such as column chromatography, recrystallization, and distillation may be performed to isolate a target compound.

The structure of the target compound may be identified by measurement such as NMR spectrometry, IR spectrometry, and mass spectrometry, and elemental analysis.

[1.2. Surfactant]

The liquid crystal composition of the present invention comprises a surfactant containing a fluorine atom in the molecule. The ratio of fluorine atom in the molecule of this surfactant is usually 30% by weight or less, preferably 25% by weight or less, and more preferably 20% by weight or less. When the surfactant containing a fluorine atom at such a specific ratio is used in combination with the polymerizable liquid crystal compound with inverse wavelength dispersion, both the surface state and orientation of a retardation layer to be produced using the liquid crystal composition of the present invention can be improved. Further, non-uniformity of retardation and thickness unevenness of the retardation layer can be usually suppressed.

According to technical common sense in prior art, as the surface tension of a liquid crystal composition is decreased by a surfactant, an effect for improving the surface state of a retardation layer to be obtained from the liquid crystal composition is expected to be increased. However, in the present invention, according to the study of the present inventors, a correlation is not necessarily recognized between an ability of decreasing the surface tension of the liquid crystal composition by the surfactant and a degree of improvement of surface state of the retardation layer. In consideration of these matters, the aforementioned effect obtained by the liquid crystal composition of the present invention is an effect that is unexpected from the technical common sense in prior art.

The surfactant containing a fluorine atom in the molecule usually contains a fluoroalkyl group. This fluoroalkyl group is preferably a perfluoroalkyl group, and particularly preferably a —$C_6F_{13}$ group, from the viewpoint of significantly exerting effects, such as improvement of surface state, improvement of orientation, suppression of non-uniformity of retardation, and suppression of thickness unevenness.

The lower limit of the ratio of the fluorine atom in the molecule of the aforementioned surfactant is not particularly limited, and is preferably 5% by weight or more, more preferably 10% by weight or more, and particularly preferably 15% by weight or more. When the ratio of the fluorine atom in the molecule of the surfactant is equal to or more than the lower limit value of the aforementioned range, both the surface state and orientation of a retardation layer to be produced using the liquid crystal composition of the present invention can be effectively improved.

The ratio of the fluorine atom in the molecule of the surfactant may be measured by the following method.

The surfactant as a sample is weighed, and combusted in a combustion tube of an analyzer. A gas generated by the combustion is absorbed by an appropriate solution, to obtain an absorbing liquid. Subsequently, a part of the absorbing liquid is analyzed by ion chromatography. As a result, the ratio of the fluorine atom in the molecule of the surfactant can be measured.

As the surfactant, a surfactant having an oligomer structure having a repeating unit, in which the number of the repeating unit contained in the molecule of the surfactant is two or more, may be used, or a surfactant having a monomer structure containing no repeating unit may be used.

As the surfactant, a non-polymerizable surfactant may be used, or a polymerizable surfactant may be used. The polymerizable surfactant is capable of being polymerized during polymerization of the polymerizable liquid crystal compound with inverse wavelength dispersion. Therefore, the polymerizable surfactant is usually contained as a part of molecule of a polymer in a retardation layer to be produced from the liquid crystal composition of the present invention.

Examples of the surfactant containing a fluorine atom as described above may include SURFLON series available from AGC Seimi Chemical Co., Ltd. (S242, S243, S386, S611, S651, etc.), MEGAFACE available from DIC Corporation (F251, F554, F556, F562, RS-75, RS-76-E, etc.), and FTERGENT series available from NEOS COMPANY LIMITED (FTX601AD, FTX602A, FTX601ADH2, FTX650A, etc.). As the surfactant, one type thereof may be solely used, and two or more types thereof may also be used in combination at any ratio.

The amount of the surfactant containing a fluorine atom as described above is preferably 0.05 parts by weight or more, more preferably 0.1 parts by weight or more, and particularly preferably 0.3 parts by weight or more, and is preferably 5.0 parts by weight or less, more preferably 1.0 part by weight or less, and particularly preferably 0.5 parts by weight or less, relative to 100 parts by weight of the polymerizable liquid crystal compound with inverse wavelength dispersion. When the amount of the surfactant is equal to or more than the lower limit value of the aforementioned range, the applying property of the liquid crystal composition onto a supporting surface during applying can be improved. When it is equal to or less than the upper limit value of the aforementioned range, the surface state can be improved while the orientation is kept.

[1.3. Solvent]

As the solvent, a solvent capable of dissolving the polymerizable liquid crystal compound with inverse wavelength dispersion may be used. As such a solvent, an organic solvent is usually used. Examples of the organic solvent may include a ketone solvent, such as cyclopentanone, cyclohexanone, methyl ethyl ketone, acetone, and methyl isobutyl ketone; an acetic acid ester solvent, such as butyl acetate, and amyl acetate; a halogenated hydrocarbon solvent, such as chloroform, dichloromethane, and dichloroethane; an ether solvent, such as 1,4-dioxane, cyclopentyl methyl ether, tetrahydrofuran, tetrahydropyran, 1,3-dioxolane, and 1,2-dimethoxyethane; and an aromatic hydrocarbon, such as toluene, xylene, and mesitylene.

As the solvent, one type thereof may be solely used, and two or more types thereof may also be used in combination at any ratio as a mixed solvent. For example, it is preferable that a ketone solvent such as cyclopentanone and an ether solvent such as 1,3-dioxolane are used in combination. In a case of such a combination, the ratio by weight of the ketone solvent relative to the ether solvent (ketone solvent/ether solvent) is preferably 10/90 or more, more preferably 30/70 or more, and particularly preferably 40/60 or more, and is preferably 90/10 or less, more preferably 70/30 or less, and particularly preferably 50/50 or less. When the ketone solvent and the ether solvent are used at the aforementioned ratio by weight, occurrence of defects during applying can be suppressed.

The boiling point of the solvent is preferably 60° C. to 250° C., and more preferably 60° C. to 150° C. from the viewpoint of excellent handleability.

The amount of the solvent is preferably 300 parts by weight or more, more preferably 350 parts by weight or more, and particularly preferably 400 parts by weight or more, and is preferably 700 parts by weight or less, more preferably 600 part by weight or less, and particularly preferably 500 parts by weight or less, relative to 100 parts by weight of the polymerizable liquid crystal compound with inverse wavelength dispersion. When the amount of the solvent is equal to or more than the lower limit value of the aforementioned range, generation of undesirable substance can be suppressed. When it is equal to or less than the upper limit value of the aforementioned range, drying load can be decreased.

[1.4. Optional Component]

The liquid crystal composition of the present invention may further contain an optional component in combination with the polymerizable liquid crystal compound with inverse wavelength dispersion, the surfactant, and the solvent described above.

For example, the liquid crystal composition of the present invention may contain a polymerization initiator. The polymerization initiator may be selected depending on the type of the polymerizable liquid crystal compound with inverse wavelength dispersion. For example, when the polymerizable liquid crystal compound with inverse wavelength dispersion is radically polymerizable, a radical polymerization initiator may be used. Further, when the polymerizable liquid crystal compound with inverse wavelength dispersion is anionically polymerizable, an anionic polymerization initiator may be used. When the polymerizable liquid crystal compound with inverse wavelength dispersion is cationically polymerizable, a cationic polymerization initiator may be used.

As the radical polymerization initiator, any of a thermal radical generator that is a compound that generates active species capable of initiating polymerization of the polymerizable liquid crystal compound with inverse wavelength dispersion by heating; and a photo-radical generator that is a compound that generates active species capable of initiating polymerization of the polymerizable liquid crystal compound with inverse wavelength dispersion by exposure to exposure light, such as visible light rays, ultraviolet rays (i-line, etc.), far-ultraviolet rays, an electron beam, and a X-ray may be used. Among these, as the radical polymerization initiator, a photo-radical generator is suitable.

Examples of the photo-radical generator may include an acetophenone-based compound, a biimidazole-based compound, a triazine-based compound, an O-acyl oxime-based compound, an onium salt-based compound, a benzoin-based compound, a benzophenone-based compound, an α-diketone-based compound, a polynuclear quinone-based compound, a xanthone-based compound, a diazo-based compound, and an imide sulfonate-based compound. These compounds is capable of generating one or both of active radical and active acid by light exposure.

Specific examples of the acetophenone-based compound may include 2-hydroxy-2-methyl-1-phenylpropan-1-one, 2-methyl-1-[4-(methylthio)phenyl]-2-morpholinopropan-1-one, 2-benzyl-2-dimethylamino-1-(4-morpholinophenyl)-butan-1-one, 1-hydroxycyclohexyl phenyl ketone, 2,2-dimethoxy-1,2-diphenylethan-1-one, 1,2-octanedione, and 2-benzyl-2-dimethylamino-4'-morpholinobutyrophenone.

Specific examples of the biimidazole-based compound may include 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6-tribromophenyl)-4,4',5,5'-tetraphenyl-1,2'-biimidazole.

When the biimidazole-based compound is used as the polymerization initiator, the sensitivity can be further improved by use of a hydrogen donor in combination with the biimidazole-based compound. Herein, the "hydrogen donor" means a compound capable of donating a hydrogen atom to a radical generated from the biimidazole-based compound by light exposure. The hydrogen donor is preferably a mercaptane-based compound or an amine-based compound, which are shown below.

Examples of the mercaptane-based compound may include 2-mercaptobenzothiazole, 2-mercaptobenzoxazole, 2-mercaptobenzimidazole, 2,5-dimercapto-1,3,4-thiadiazole, and 2-mercapto-2,5-dimethylaminopyridine. Examples of the amine-based compound may include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile.

Examples of the triazine-based compound may include a triazine-based compound having a halomethyl group, such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, and 2-(4-n-butoxyphenyl)-4,6-bis(trichloromethyl)-s-triazine.

Specific examples of the O-acyl oxime-based compound may include 1-[4-(phenylthio)phenyl]-heptane-1,2-dione 2-(O-benzoyloxime), 1-[4-(phenylthio)phenyl]-octane-1,2-dione 2-(O-benzoyloxime), 1-[4-(benzoyl)phenyl]-octane-1,2-dione 2-(O-benzoyloxime), 1-[9-ethyl-6-(2-methylbenzoyl)-9H-carbazol-3-yl]-ethanone 1-(O-acetyloxime), 1-[9-ethyl-6-(3-methylbenzoyl)-9H-carbazol-3-yl]-ethanone 1-(O-acetyloxime), 1-(9-ethyl-6-benzoyl-9H-carbazol-3-yl)-ethanone 1-(O-acetyloxime), ethanone-1-[9-ethyl-6-(2-methyl-4-tetrahydrofuranylbenzoyl)-9.H.-carbazol-3-yl]-1-(O-acetyloxime), ethanone-1-[9-ethyl-6-(2-methyl-4-tetrahydropyranylbenzoyl)-9.H.-carbazol-3-yl]-1-(O-acetyloxime), ethanone-1-[9-ethyl-6-(2-methyl-5-tetrahydrofuranylbenzoyl)-9.H.-carbazol-3-yl]-1-(O-acetyloxime), ethanone-1-[9-ethyl-6-(2-methyl-5-tetrahydropyranylbenzoyl)-9.H.-carbazol-3-yl]-1-(O-acetyloxime), ethanone-1-[9-ethyl-6-{2-methyl-4-(2,2-dimethyl-1,3-dioxolanyl)benzoyl}-9.H.-carbazol-3-yl]-1-(O-acetyloxime), ethanone-1-[9-ethyl-6-(2-methyl-4-tetrahydrofuranylmethoxybenzoyl)-9.H.-carbazol-3-yl]-1-(O-acetyloxime), ethanone-1-[9-ethyl-6-(2-methyl-4-tetrahydropyranylmethoxybenzoyl)-9.H.-carbazol-3-yl]-1-(O-acetyloxime), ethanone-1-[9-ethyl-6-(2-methyl-5-tetrahydrofuranylmethoxybenzoyl)-9.H.-carbazol-3-yl]-1-(O-acetyloxime), ethanone,1-[9-ethyl-6-(2-methylbenzoyl)-9H-carbazol-3-yl]-1-(O-acetyloxime), ethanone-1-[9-ethyl-6-(2-methyl-5-tetrahydropyranylmethoxybenzoyl)-9.H.-carbazol-3-yl]-1-(O-acetyloxime), and ethanone-1-[9-ethyl-6-{2-methyl-4-(2,2-dimethyl-1,3-dioxolanyl)methoxybenzoyl}-9.H.-carbazol-3-yl]-1-(O-acetyloxime).

As the photo-radical generator, a commercially available product as it is may be used. Specific examples thereof may include trade name: Irgacure907, Irgacure184, Irgacure369, Irgacure651, Irgacure819, Irgacure907, Irgacure379, and Irgacure OXE02, available from BASF, and trade name: ADEKA OPTOMER N1919 available from ADEKA CORPORATION.

Examples of the anionic polymerization initiator may include an alkyl lithium compound; a monolithium salt or a monosodium salt of biphenyl, naphthalene, and pyrene; and a polyfunctional initiator such as a dilithium salt, and a trilithium salt.

Examples of the cationic polymerization initiator may include a protonic acid, such as sulfuric acid, phosphoric acid, perchloric acid, and trifluoromethanesulfonic acid; Lewis acids, such as boron trifluoride, aluminum chloride, titanium tetrachloride, and tin tetrachloride; and an aromatic onium salt, and a combination of an aromatic onium salt with a reducing agent.

As the polymerization initiator, one type thereof may be solely used, and two or more types thereof may also be used in combination at any ratio.

The amount of the polymerization initiator is preferably 0.1 parts by weight or more, and more preferably 0.5 parts by weight or more, and is preferably 30 parts by weight or less, and more preferably 10 parts by weight or less, relative to 100 parts by weight of the polymerizable liquid crystal compound with inverse wavelength dispersion. When the amount of the polymerization initiator falls within the aforementioned range, polymerization of the polymerizable liquid crystal compound with inverse wavelength dispersion can efficiently proceed.

Examples of the optional component to be contained in the liquid crystal composition of the present invention may include additives including a polymerizable compound other than the polymerizable liquid crystal compound with inverse wavelength dispersion; a metal; a metal complex; a metal oxide such as titanium oxide; a colorant such as a dye and a pigment; a light-emitting material such as a fluorescent material and a phosphorescent material; a leveling agent; a thixotropic agent; a gelator; a polysaccharide; an ultraviolet ray absorber; an infrared absorber; an antioxidant; and an ion exchange resin. One type thereof may be solely used, and two or more types thereof may also be used in combination at any ratio.

The amount of the additives may be appropriately set within the range in which the effects of the present invention are not significantly impaired. Specifically, the amount of each of the additives may be 0.1 parts by weight to 20 parts by weight relative to 100 parts by weight of the polymerizable liquid crystal compound with inverse wavelength dispersion.

[2. Method for Producing Retardation Layer]

A retardation layer may be produced using the liquid crystal composition of the present invention. The method for producing such a retardation layer includes:

(i) a step of applying the liquid crystal composition of the present invention onto a supporting surface to form a layer of the liquid crystal composition;

(ii) a step of orienting the polymerizable liquid crystal compound with inverse wavelength dispersion contained in the layer of the liquid crystal composition; and (iii) a step of polymerizing the polymerizable liquid crystal compound with inverse wavelength dispersion to obtain the retardation layer.

[2.1. Formation of Layer of Liquid Crystal Composition]

As the supporting surface, any surface capable of supporting the layer of the liquid crystal composition may be used. As such a supporting surface, a flat surface having no concave or convex portions is usually used from the viewpoint of improving the surface state of the retardation layer.

As the supporting surface, a surface of a long-length substrate is preferably used from the viewpoint of increasing the productivity of the retardation layer. The "long-length" herein means a shape having a length that is at least 5 times or more longer than the width, and preferably 10 times or more longer than the width, and specifically means a shape of a film having such a length that the film can be wound up into a roll shape for storage or conveyance.

The material of a substrate is not particularly limited, and a substrate formed from a resin is usually used. Examples of the resin forming the substrate may include resins containing various types of polymers. Examples of the polymers may include an alicyclic structure-containing polymer such as a norbornene-based polymer, a cellulose ester, a polyvinyl alcohol, a polyimide, UV-transmitting acrylic, a polycarbonate, a polysulfone, a polyether sulfone, an epoxy polymer, a polystyrene, and a combination thereof. Among these, an alicyclic structure-containing polymer and a cellulose ester are preferable, and an alicyclic structure-containing polymer is more preferable from the viewpoint of transparency, low hygroscopicity, size stability, and lightweight properties.

In order to promote orientation of the polymerizable liquid crystal compound with inverse wavelength dispersion in the layer of the liquid crystal composition, the substrate may be subjected to a treatment for imparting an orientation regulating force to the surface of the substrate.

Examples of the treatment for imparting an orientation regulating force may include a rubbing treatment. When the rubbing treatment is performed on the surface of the substrate, an orientation regulating force of imparting homogeneous orientation to the polymerizable liquid crystal compound with inverse wavelength dispersion contained in the layer of the liquid crystal composition can be imparted to the surface. Examples of a method of rubbing treatment may include a method in which the surface of the substrate is rubbed in a constant direction with a roll wrapped with cloth or felt formed of synthetic fibers such as nylon or natural fibers such as cotton. In order to make the treated surface where powders generated during the rubbing treatment are removed clean, it is preferable that the treated surface is cleaned with a cleaning liquid such as isopropyl alcohol after the rubbing treatment.

Examples of the treatment for imparting an orientation regulating force may include a treatment of forming an orientation layer on the surface of the substrate. The orientation layer is a layer which is capable of causing orientation of the polymerizable liquid crystal compound with inverse wavelength dispersion in the liquid crystal composition in one direction in the plane. When the orientation layer is provided, the layer of the liquid crystal composition may be formed on a surface of the orientation layer.

The orientation layer usually contains a polymer, such as a polyimide, a polyvinyl alcohol, a polyester, a polyarylate, a polyamideimide, and a polyeterimide. The orientation layer may be produced by applying a solution containing such a polymer onto a substrate in a film shape, drying the solution, and performing a rubbing treatment in one direction. Other than the rubbing treatment, an orientation regulating force may also be imparted to the orientation layer by a method of irradiating the surface of the orientation layer with polarized ultraviolet rays. The thickness of the orientation layer is preferably 0.001 µm to 5 µm, and more preferably 0.001 µm to 1 µm.

Examples of the treatment for imparting an orientation regulating force may include a stretching treatment. When a stretching treatment is performed on the substrate under suitable conditions, molecules of the polymer contained in in the substrate can be oriented. Consequently, an orientation regulating force of orienting the polymerizable liquid crystal compound with inverse wavelength dispersion in an orientation direction of molecules of the polymer contained in the substrate can be imparted to the surface of the substrate.

It is preferable that the substrate is stretched in a manner whereby anisotropy is imparted to the substrate and a slow axis is expressed in the substrate. By such stretching, an orientation regulating force of orienting the polymerizable liquid crystal compound with inverse wavelength dispersion in a direction parallel or perpendicular to the slow axis of the substrate is usually imparted to the surface of the substrate. Therefore, the stretching direction of the substrate may be set depending on a desired orientation direction in which the polymerizable liquid crystal compound with inverse wavelength dispersion is to be oriented. In particular, it is preferable that the slow axis is expressed at an angle of 45° relative to a direction of winding the substrate.

The stretching ratio may be set so that the birefringence Δn of the substrate after stretching falls within a desired range. The birefringence Δn of the substrate after stretching is preferably 0.000050 or more, and more preferably 0.000070 or more, and is preferably 0.007500 or less, and more preferably 0.007000 or less. When the birefringence Δn of the substrate after stretching is equal to or more than the lower limit value of the aforementioned range, favorable orientation regulating force can be imparted to the surface of the substrate. When the birefringence Δn is equal to or less than the upper limit value of the aforementioned range, the retardation of the substrate can be decreased. Therefore, even when the substrate is not separated from a retardation layer, the substrate and the retardation layer can be used in combination for various types of applications.

The stretching may be performed by a stretching machine such as a tenter stretching machine.

Examples of the treatment for imparting an orientation regulating force may include an ion beam orientation treatment. In the ion beam orientation treatment, an ion beam of $Ar^+$ or the like is made incident on the substrate, whereby an orientation regulating force can be imparted to the surface of the substrate.

The thickness of the substrate is not particularly limited, and is preferably 1 μm or more, more preferably 5 μm or more, and particularly preferably 30 μm or more, and is preferably 1,000 μm or less, more preferably 300 μm or less, and particularly preferably 100 μm or less from the viewpoint of productivity improvement and facilitation of reduction in thickness and weight.

After the substrate is prepared, if necessary, as described above, the step of applying the liquid crystal composition of the present invention onto the supporting surface of the substrate to form the layer of the liquid crystal composition is performed. Examples of a method of applying the liquid crystal composition may include a curtain coating method, an extrusion coating method, a roll coating method, a spin coating method, a dip coating method, a bar coating method, a spray coating method, a slide coating method, a printing coating method, a gravure coating method, a die coating method, a cap coating method, and a dipping method. The thickness of the layer of the liquid crystal composition to be applied may be appropriately set depending on a desired thickness required for a retardation layer.

[2.2. Orientation of Polymerizable Liquid Crystal Compound with Inverse Wavelength Dispersion]

After the layer of the liquid crystal composition is formed, the step of orienting the polymerizable liquid crystal compound with inverse wavelength dispersion contained in the layer is performed. Usually the polymerizable liquid crystal compound with inverse wavelength dispersion can be oriented by performing an orientation treatment such as warming on the layer of the liquid crystal composition. The conditions for the orientation treatment may be appropriately set depending on the properties of the liquid crystal composition used. For example, the conditions for the orientation treatment may be conditions of treatment for 30 seconds to 5 minutes under a temperature condition of 50° C. to 160° C.

However, the orientation of the polymerizable liquid crystal compound with inverse wavelength dispersion can be achieved immediately by applying the liquid crystal composition of the present invention. Therefore, the orientation treatment for orienting the polymerizable liquid crystal compound with inverse wavelength dispersion may not be necessarily performed on the layer of the liquid crystal composition.

[2.3. Polymerization of Polymerizable Liquid Crystal Compound with Inverse Wavelength Dispersion]

After the polymerizable liquid crystal compound with inverse wavelength dispersion is oriented, the step of polymerizing the polymerizable liquid crystal compound with inverse wavelength dispersion to obtain a retardation layer is performed. As a method for polymerizing the polymerizable liquid crystal compound with inverse wavelength dispersion, a method suitable for the properties of components contained in the liquid crystal composition may be selected. Examples of the polymerization method may include an irradiation method with an active energy ray and a thermal polymerization method. Among these, the irradiation method with an active energy ray is preferable since the polymerization reaction may proceed at room temperature without heating. Examples of the active energy ray for irradiation in this method may include light such as visible light rays, ultraviolet rays, and infrared rays, and any energy ray such as an electron beam.

In particular, an irradiation method with light such as ultraviolet rays is preferable because of simple operation. The temperature during irradiation with ultraviolet rays is preferably equal to or lower than the glass transition temperature of the substrate, and usually 150° C. or lower, preferably 100° C. or lower, and more preferably 80° C. or lower. The lower limit of temperature during irradiation with ultraviolet rays may be 15° C. or higher. The irradiation intensity of ultraviolet rays is preferably 0.1 mW/cm² or more, and more preferably 0.5 mW/cm² or more, and is preferably 1,000 mW/cm² or less, and more preferably 600 mW/cm² or less.

[2.4. Optional Step]

In addition to the aforementioned steps, the method for producing a retardation layer may further include an optional step.

For example, the method for producing a retardation layer may include a step of drying the layer of the liquid crystal composition after the step of orienting the polymerizable liquid crystal compound with inverse wavelength dispersion contained in the layer of the liquid crystal composition and before the step of polymerizing the polymerizable liquid crystal compound with inverse wavelength dispersion. The drying can be achieved by a drying method such as natural air drying, heated-air drying, drying under reduced pressure, and heated-air drying under reduced pressure. By the drying, the solvent can be removed from the layer of the liquid crystal composition.

For example, the method for producing a retardation layer may include a step of separating the resulting retardation layer from the supporting surface.

[2.5. Retardation Layer to be Produced]

The retardation layer produced as described above contains a polymer obtained by polymerizing the polymerizable liquid crystal compound with inverse wavelength dispersion. Since the polymer is a polymer obtained by polymerizing the polymerizable liquid crystal compound with inverse wavelength dispersion while orientation of molecules in a liquid crystal phase is maintained, the polymer has homogeneous orientation regularity. Herein, "having homogeneous orientation regularity" means that long-axis directions of mesogens of molecules of a polymer are aligned in one certain direction horizontal to a surface of the retardation layer. The long-axis directions of mesogens of molecules of the polymer is the long-axis direction of mesogen of the polymerizable liquid crystal compound with inverse wavelength dispersion that corresponds to the polymer. When a plurality of types of mesogens having different orientation directions exist in the retardation layer such as in a case of using the compound (I) as the polymerizable liquid crystal compound with inverse wavelength dispersion, the direction in which the mesogens of the longest type among the mesogens are aligned is referred to as the alignment direction.

Such a retardation layer usually has a slow axis that is parallel to the alignment direction of the aforementioned polymer corresponding to the orientation regularity of the polymer as described above. The presence of homogeneous orientation regularity of the polymer obtained by polymerization of the polymerizable liquid crystal compound with inverse wavelength dispersion and the alignment direction thereof may be confirmed by measurement of the slow axis direction using a retardation meter typified by AxoScan (manufactured by Axometrics, Inc.) and measurement of retardation distribution of each incidence angle in the slow axis direction.

Since the retardation layer contains the polymer obtained by polymerization of the polymerizable liquid crystal compound with inverse wavelength dispersion, the retardation layer has birefringence with inverse wavelength dispersion. Therefore, the retardation layer can have retardation with inverse wavelength dispersion. Herein, the retardation with inverse wavelength dispersion refers to retardation in which a retardation $Re(450)$ at a wavelength of 450 nm, a retardation $Re(550)$ at a wavelength of 550 nm, and retardation $Re(650)$ at a wavelength of 650 nm usually satisfy the following equation (3), and preferably the following equation (4). When the retardation layer has retardation with inverse wavelength dispersion, the retardation layer can uniformly express a function over a wide region for optical applications such as a ¼ wave plate or ½ wave plate.

$$Re(450) < Re(650) \quad (3)$$

$$Re(450) < Re(550) < Re(650) \quad (4)$$

The specific range of retardation of the retardation layer may be optionally set depending on the application of the retardation layer. For example, when the retardation layer is required to function as a ¼ wave plate, the retardation $Re(550)$ of the retardation layer is preferably 80 nm or more, more preferably 100 nm or more, and particularly preferably 120 nm or more, and is preferably 180 nm or less, more preferably 160 nm or less, and particularly preferably 150 nm or less.

Since the aforementioned retardation layer is produced using the liquid crystal composition of the present invention, the retardation layer has excellent surface state. Herein, the retardation layer that has excellent surface state refers to a retardation layer having a smooth surface shape with reduced unevenness and defects.

Since the aforementioned retardation layer is produced using the liquid crystal composition of the present invention, the retardation layer has excellent orientation. Herein, the retardation layer that has excellent orientation refers to a retardation layer in which the number of orientation defects of the polymer obtained by polymerization of the polymerizable liquid crystal compound with inverse wavelength dispersion contained in the retardation layer is small.

As described above, since the retardation layer has both excellent surface state and orientation, the antireflection performance of a circularly polarizing plate having the retardation layer can be made uniform in the plane of the circularly polarizing plate.

Further, the non-uniformity of retardation and thickness unevenness of the aforementioned retardation layer can be usually suppressed. Therefore, the antireflection performance of the circularly polarizing plate provided with the retardation layer can be further highly made uniform in the plane of the circularly polarizing plate.

The thickness of the retardation layer may be appropriately set so that characteristics such as retardation fall within a desired range. For example, the thickness of the retardation layer is preferably 0.5 μm or more, and more preferably 1.0 μm or more, and is preferably 10 μm or less, and more preferably 7 μm or less.

The retardation layer may be used for optical applications, and is particularly suitable for a wave plate such as a ¼ wave plate and a ½ wave plate.

The aforementioned wave plate may have only the retardation layer. The wave plate having only the retardation layer as described above may be produced, for example, by separating the retardation layer formed on the substrate from the substrate, and cutting the retardation layer into a desired shape suitable for applications, such as a rectangle.

The aforementioned wave plate may have the substrate used in production of the retardation layer in addition to the retardation layer. For example, as the wave plate having the retardation layer and the substrate as described above, a multilayer film having the substrate and the retardation layer as it is, which is obtained without separation of the retardation layer formed on the substrate from the substrate, may be used.

The aforementioned wave plate may have an optional layer in addition to the retardation layer and the substrate. Examples of the optional layer may include an adhesive layer for adhesion with another member, a mat layer that gives favorable slidability to the film, a hardcoat layer such as an impact resistant polymethacrylate resin layer, an antireflective layer, and an antifouling layer.

[3. Circularly Polarizing Plate]

The circularly polarizing plate of the present invention comprises a linear polarizer and the retardation layer produced using the liquid crystal composition of the present invention.

As the linear polarizer, a known linear polarizer used in a device such as a liquid crystal display device may be used. Examples of the linear polarizer may include a linear polarizer obtained by causing a polyvinyl alcohol film to absorb iodine or a dichroic dye, and uniaxially stretching the film in a boric acid bath; and a linear polarizer obtained by causing a polyvinyl alcohol film to absorb iodine or dichroic dye, stretching the film, and modifying part of the polyvinyl alcohol unit in the molecular chain into a polyvinylene unit. Other examples of the linear polarizer may include a polarizer having a function of separating polarized light into reflective light and transmitted light, such as a grid polarizer, a multilayer polarizer, and a cholesteric liquid crystal polarizer. Among these, a polarizer containing polyvinyl alcohol is preferable.

When natural light is made incident on the linear polarizer, only one polarized light is transmitted. The polarization degree of the linear polarizer is preferably 98% or more, and more preferably 99% or more. The average thickness of the linear polarizer is preferably 5 μm to 80 μm.

It is preferable that the retardation layer has such appropriate retardation that it can function as a ¼ wave plate. The angle formed between the slow axis of the retardation layer and a transmission axis of the linear polarizer is preferably 45° or an angle close to 45° as viewed in the thickness direction, and preferably specifically 40° to 50°.

One of applications of such a circularly polarizing plate may be an application of antireflective film for a display device such as an organic electroluminescent display device. When the circularly polarizing plate is provided on a surface of the display device so that a surface on a linear polarizer side is disposed toward a viewer side, emission of light which has been made incident from the outside of the device and reflected inside the device to the outside of the device can be suppressed. As a result, glare on a display surface of the display device can be suppressed. Specifically, when light is incident from the outside of the device, only a part of linearly polarized light passes through the linear polarizer, which then passes through the retardation layer to be circularly polarized light. The circularly polarized light is reflected on a component in the device that reflects light (reflection electrode, etc.), and again passes through the retardation layer, resulting in linearly polarized light having a polarization axis in a direction orthogonal to the polarization axis of the linearly polarized light that has been incident. Thus, the light does not pass through the liner polarizer. Therefore, the antireflection function is achieved.

The circularly polarizing plate may be further provided with an optional layer, in addition to the linear polarizer and the retardation layer.

EXAMPLES

Hereinafter, the present invention will be specifically described with reference to Examples. However, the present invention is not limited to Examples described below. The present invention may be freely modified and practiced without departing from the scope of claims of the present invention and the scope of their equivalents.

Unless otherwise specified, "%" and "part(s)" that represent an amount in the following description are on the basis of weight. Unless otherwise specified, operations described below were performed under conditions of normal temperature and normal pressure.

[Evaluation and Measurement Method]
[1. Method for Measuring Content of Fluorine Atom in Surfactant]

A surfactant as a sample was weighed, and combusted in a combustion tube of an analyzer. A gas generated by the combustion was absorbed by a solution. Subsequently, part of the absorbing liquid was analyzed by ion chromatography, whereby the ratio of fluorine atom in the molecule of the surfactant was measured. The conditions in each step are as follows.

(1.1. Combustion and Absorption Conditions)
System: AQF-2100 and GA-210 (manufactured by Mitsubishi Chemical Corporation)
Electric furnace temperature: Inlet: 900° C., Outlet: 1,000° C.
Gas: $Ar/O_2$ 200 mL/min
$O_2$ 400 mL/min
Absorbing liquid: solvent: $H_2O_2$ 90 μg/mL,
Internal standard substance: P 4 μg/mL or Br 8 μg/mL
Amount of absorbing liquid: 20 mL
(1.2. Conditions for Ion Chromatography and Anionic Analysis)
System: ICS1600 (manufactured by DIONEX)
Mobile phase: 2.7 mmol/L $Na_2CO_3$/0.3 mmol/L $NaHCO_3$
Flow rate: 1.50 mL/min
Detector: electric conductivity detector
Injection volume: 20 μL

[2. Method for Evaluating Surface State of Retardation Layer]

A pair of linear polarizers (polarizer and analyzer) were stacked in parallel nicols on a light table. Herein, parallel nicols is an aspect in which polarized light transmission axes of the linear polarizers are in parallel.

The multilayer film produced in each of Examples and Comparative Examples was cut into a 16-cm square, to obtain a film piece for measurement. The film piece was disposed between the linear polarizers disposed on the light table as described above. At that time, the slow axis of the film piece was set at an angle of approximately 450 relative to the absorption axis of the polarizer as viewed in the thickness direction. Subsequently, the film piece was visually observed. The surface state of a retardation layer was evaluated in accordance with the following criteria according to uniformity of the image observed (uniformity of retardation).

I: The overall surface was almost uniform, and unevenness and defect were not recognized.

II: The overall surface was almost uniform, but minute unevenness was slightly recognized.

III: Unevenness was clearly recognized.

IV: Strong unevenness was observed on the overall surface.

Separately, a stretched substrate produced in Production Example 1 was disposed between the pair of linear polarizers disposed on the light table, and visually observed. As a result, when only the stretched substrate having no retardation layer was used instead of the film piece and observed, the overall surface was almost uniform, and unevenness and defect were not recognized. From this result, it was confirmed that occurrence of the unevenness and defect observed in the evaluation described above was caused by the surface state of the retardation layer.

[3. Method for Evaluating Orientation of Retardation Layer]

The retardation layer of the multilayer film produced in each of Examples and Comparative Examples was transferred to a glass plate, to obtain a sample for measurement having the glass plate and the retardation layer. The retardation layer of the sample for measurement was observed by a polarized light microscope under crossed nicols. Herein, crossed nicols is an aspect in which the polarized light transmission axes of linear polarizers (polarizer and analyzer) provided in the polarized light microscope are perpendicular as viewed in the thickness direction. During observation, the position of the retardation layer was set to an extinction position and a position where the slow axis of the retardation layer was shifted from the extinction position by several degrees. Herein, the extinction position is a position where light to be observed is the weakest. The magnification of the polarized light microscope during observation was set to an objective magnification of 5 times and 50 times. The orientation of the retardation layer was evaluated in accordance with the following criteria according to the degree of orientation defect observed and the state of light leakage at the extinction position.

Excellent: An orientation defect was not recognized, and light leakage at the extinction position was almost unrecognized.

Good: A structure like an orientation defect was slightly recognized, and light leakage at the extinction position was slightly recognized.

Bad: An orientation defect was clearly recognized, and light leaked at the extinction position.

[4. Method for Evaluating Non-uniformity of Retardation of Retardation Layer]

The multilayer film produced in each of Examples and Comparative Examples was cut into a 16-cm square, to obtain a film piece for measurement. For a range of 13 cm×10 cm at the central part of the film piece, retardation mapping measurement was performed at pitches of 0.5 mm using a retardation measurement device ("KAMAKIRI" manufactured by PHOTRON LIMITED). From the measurement data, the non-uniformity of retardation of the retardation layer was evaluated.

Separately, the stretched substrate produced in Production Example 1 was subjected to retardation mapping measurement using the retardation measurement device described above. As a result, when only the stretched substrate having no retardation layer was used instead of the film piece in measurement, non-uniformity of retardation was not recognized. From this result, it was confirmed that occurrence of the non-uniformity of retardation observed in the evaluation described above was caused in the retardation layer.

[5. Evaluation of Thickness Unevenness of Retardation Layer]

The multilayer film produced in each of Examples and Comparative Examples was cut into a 16-cm square, to obtain a film piece for measurement. For a range of 13 cm×10 cm at the central part of the film piece, mapping measurement of film thickness including the stretched substrate was performed at pitches of 0.2 mm by scanning using an interference film thickness meter ("SI-T80" manufactured by KEYENCE CORPORATION). From the measurement data, the thickness unevenness of the retardation layer was evaluated.

Separately, the stretched substrate produced in Production Example 1 was subjected to film thickness mapping measurement using the interference film thickness meter described above. As a result, when only the stretched substrate having no retardation layer was used instead of the film piece in measurement, thickness unevenness was not recognized. From this result, it was confirmed that occurrence of the thickness unevenness observed in the evaluation described above was caused in the retardation layer.

[6. Method for Measuring In-Plane Retardation of Retardation Layer]

The retardation layer of the multilayer film produced in each of Examples and Comparative Examples was transferred to a glass plate, to obtain a sample for measurement having the glass plate and the retardation layer. Using this sample for measurement, the in-plane retardation Re of the retardation layer was measured at a wavelength of 450 nm, 550 nm, and 650 nm by a polarimeter ("AxoScan" manufactured by Axometrics, Inc.).

Production Example 1: Production of Stretched Substrate (Production of Pre-Stretch Substrate)

Pellets of a thermoplastic norbornene resin ("ZEONOR1420R" available from ZEON CORPORATION) were dried at 90° C. for 5 hours. The dried pellets were supplied to an extruder, melted in the extruder, passed through a polymer pipe and a polymer filter, and extruded from a T-die on a casting drum in a film shape. The film was cooled to produce a long-length pre-stretch substrate having a thickness of 60 μm and a width of 1,490 mm. The produced pre-stretch substrate was wound to obtain a roll.

(Stretching Treatment)

The pre-stretch substrate described above was drawn from the roll and supplied to a tenter stretching machine. The pre-stretch substrate was stretched using the tenter stretching machine so that an angle of the slow axis of a stretched substrate to be obtained after stretching was 450 relative to the winding direction of stretched substrate. Both ends of the film in a film widthwise direction were trimmed, and the film was wound to obtain a roll of the long-length stretched substrate having a width of 1,350 mm. The in-plane retardation Re of the obtained stretched substrate at a measurement wavelength of 550 nm was 148 nm, and the thickness thereof was 47 μm.

1. Example 1: Production of Retardation Layer Using Liquid Crystal Composition Including Polymerizable Liquid Crystal Compound with Inverse Wavelength Dispersion (1-1. Production of Liquid Crystal Composition)

100.0 Parts of a polymerizable liquid crystal compound with inverse wavelength dispersion A, 0.30 parts of a surfactant ("MEGAFACE F-251" available from DIC Corporation), 3.0 parts of a polymerization initiator ("IRGACURE379" available from BASF), and 188.0 parts of cyclopentanone (available from ZEON CORPORATION) and 282.0 parts of 1,3-dioxolane (available from TOHO Chemical Industry Co., Ltd.) as solvents were mixed to produce a liquid crystal composition in a liquid state.

(1-2. Formation of Retardation Layer)

The stretched substrate produced in Production Example 1 was drawn from the roll and conveyed. The liquid crystal composition produced in Step (1-1) was applied onto one surface of the stretched substrate by a die coater to form a layer of the liquid crystal composition. The layer of the liquid crystal composition was subjected to an orientation treatment at 110° C. for 4 minutes, irradiated with ultraviolet rays of 400 mJ/cm$^2$ under an N$_2$ atmosphere, and cured to form a retardation layer. As a result, a multilayer film having a stretched substrate and a retardation layer with a dry thickness of 2.2 μm formed on the stretched substrate was obtained. The obtained retardation layer contained a polymer obtained by polymerizing the polymerizable liquid crystal compound with inverse wavelength dispersion. The polymer had homogeneous orientation regularity. The angle of slow axis of the retardation layer was confirmed to be 45° relative to the winding direction, which was the same as that of the stretched substrate used in applying.

The in-plane retardation Re of the retardation layer was measured by the method described above. The Re(450) at a measurement wavelength of 450 nm was 111 nm, the Re(550) at a measurement wavelength of 550 nm was 140 nm, and the Re(650) at a measurement wavelength of 650 nm was 145 nm. From these results, it was confirmed that the birefringence Δn of the polymerizable liquid crystal compound A used in Example 1 had a characteristics in which the birefringence was increased at a longer measurement wavelength (inverse wavelength dispersion).

Examples 2 to 13 and Comparative Examples 1 to 14

(i) The type of the polymerizable liquid crystal compound with inverse wavelength dispersion, (ii) the type of the surfactant, and (iii) the amount of the surfactant that were used in preparation of a liquid crystal composition were changed as shown in Table 1. A multilayer film having a stretched substrate and a retardation layer was produced in the same manner as in Example 1 except for the aforementioned matters.

The retardation layer in the produced multilayer film contained a polymer obtained by polymerizing the polymerizable liquid crystal compound with inverse wavelength dispersion. The polymer had homogeneous orientation regularity. The angle of slow axis of the retardation layer was confirmed to be 45° relative to the winding direction. The in-plane retardation Re of the retardation layer was measured. It was confirmed that the birefringence Δn of the used polymerizable liquid crystal compound with inverse wavelength dispersion had a characteristic in which the birefringence was increased at a longer measurement wavelength (inverse wavelength dispersion).

Comparative Example 15: Production of Retardation Layer Using Liquid Crystal Composition Including Polymerizable Liquid Crystal Compound with Forward Wavelength Dispersion (15-1. Production of Liquid Crystal Composition)

100.0 Parts of a polymerizable liquid crystal compound LC242 capable of expressing birefringence of forward wavelength dispersion ("LC242" available from BASF), 0.30 parts of a surfactant ("FTERGENT FTX-208G" available from NEOS COMPANY LIMITED), 3.0 parts of a polymerization initiator ("IRGACURE379" available from BASF), and 470 parts of methyl ethyl ketone (available from Maruzen Petrochemical Co., Ltd.) as a solvent were mixed to produce a liquid crystal composition in a liquid state.

(15-2. Formation of Retardation Layer)

The stretched substrate produced in Production Example 1 was drawn from the roll and conveyed. The liquid crystal composition produced in Step (15-1) was applied onto one surface of the stretched substrate by a die coater to form a layer of the liquid crystal composition. The layer of the liquid crystal composition was subjected to an orientation treatment at 100° C. for 2 minutes, irradiated with ultraviolet rays of 400 mJ/cm² or more under an $N_2$ atmosphere, and cured to form a retardation layer. As a result, a multilayer film having a stretched substrate and a retardation layer with a dry thickness of 1.2 μm formed on the stretched substrate was obtained. The obtained retardation layer contained a polymer obtained by polymerizing the polymerizable liquid crystal compound. The polymer had homogeneous orientation regularity. The angle of slow axis of the retardation layer was confirmed to be 45° relative to the winding direction, which was the same as that of the stretched substrate used in applying.

The in-plane retardation of the retardation layer was measured by the method described above. The Re(450) at a measurement wavelength of 450 nm was 151 nm, the Re(550) at a measurement wavelength of 550 nm was 140 nm, and the Re(650) at a measurement wavelength of 650 nm was 136 nm. From these results, it was confirmed that the birefringence of the polymerizable liquid crystal compound LC242 used in Comparative Example 15 had a characteristic in which the birefringence was decreased at a longer measurement wavelength (forward wavelength dispersion).

Comparative Examples 16 to 31

(i) The type of the polymerizable liquid crystal compound, (ii) the type of the surfactant, and (iii) the amount of the surfactant that were used in preparation of a liquid crystal composition were changed as shown in Table 2. A multilayer film having a stretched substrate and a retardation layer was produced in the same manner as in Comparative Example 15 except for the aforementioned matters.

The retardation layer in the produced multilayer film contained a polymer obtained by polymerizing the polymerizable liquid crystal compound. The polymer had homogeneous orientation regularity. The angle of slow axis of the retardation layer was confirmed to be 45° relative to the winding direction. The in-plane retardation Re of the retardation layer was measured. It was confirmed that the birefringence Δn of the used polymerizable liquid crystal compound had a characteristic in which the birefringence was decreased at a longer measurement wavelength (forward wavelength dispersion).

[Evaluation]

For the multilayer films produced in all Examples and Comparative Examples, the surface state and orientation of the retardation layer were evaluated. The results are shown in Tables 1 and 2.

Images observed in evaluation of surface state in Examples 2 and 5 and Comparative Examples 3 and 5 are shown in FIGS. 1 to 4, respectively.

In Examples 2 and 5 and Comparative Examples 3 and 5, non-uniformity of retardation was evaluated. Mapping views of retardations measured in Examples 2 and 5 and Comparative Examples 3 and 5 are shown in FIGS. 5 to 8, respectively. From the retardations measured in Examples 2 and 5 and Comparative Examples 3 and 5, retardations at points on a line parallel to the widthwise direction of the retardation layer were extracted. Graphs of the extracted retardations are shown in FIGS. 9 to 12.

In Examples 2 and 5 and Comparative Examples 3 and 5, thickness unevenness was evaluated. The mapping views of thicknesses measured in Examples 2 and 5 and Comparative Examples 3 and 5 are shown in FIGS. 13 to 16, respectively. From the thicknesses measured in Examples 2 and 5 and Comparative Examples 3 and 5, thicknesses at points on a line parallel to the widthwise direction of the retardation layer were extracted. Graphs of the extracted thicknesses are shown in FIGS. 17 to 20.

[Results]

The following Tables 1 and 2 are to show the results in Examples and Comparative Examples. Abbreviations in the following Tables each mean as follows.

Polymerizable liquid crystal compound "A": polymerizable liquid crystal compound with inverse wavelength dispersion represented by the following Formula (A).

Polymerizable liquid crystal compound "B": polymerizable liquid crystal compound with inverse wavelength dispersion represented by the following Formula (B).

Polymerizable liquid crystal compound "C": polymerizable liquid crystal compound with inverse wavelength dispersion represented by the following Formula (C).

Polymerizable liquid crystal compound "D": polymerizable liquid crystal compound with inverse wavelength dispersion represented by the following Formula (D).

Polymerizable liquid crystal compound "E": polymerizable liquid crystal compound with inverse wavelength dispersion represented by the following Formula (E).

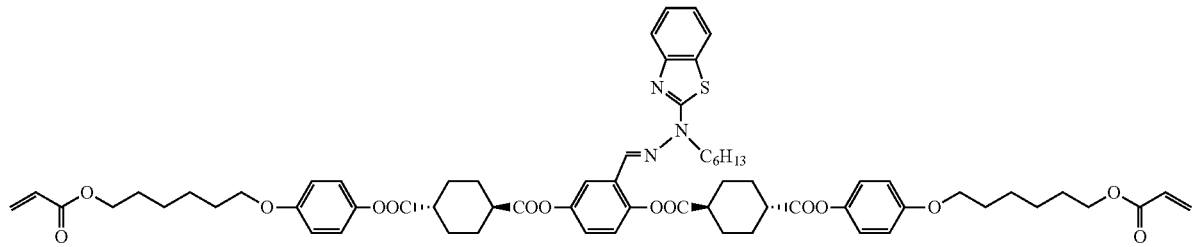

Polymerizable liquid crystal compound A

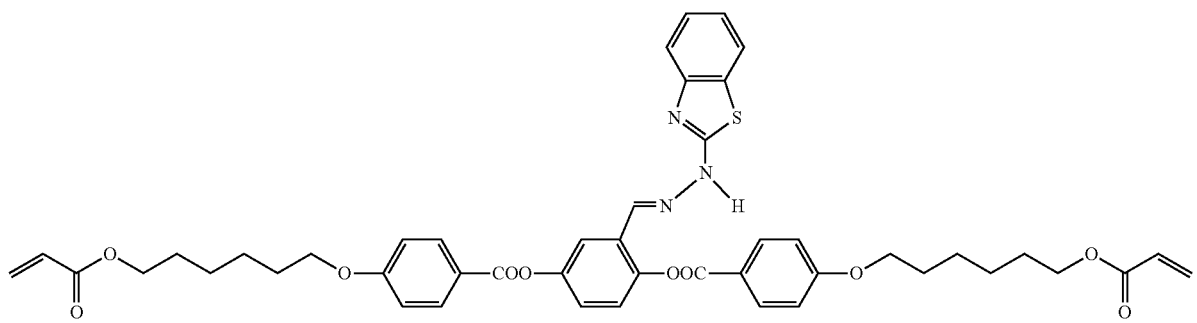

Polymerizable liquid crystal compound B

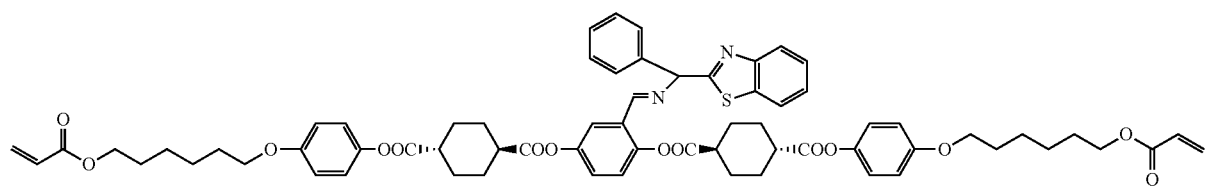

Polymerizable liquid crystal compound C

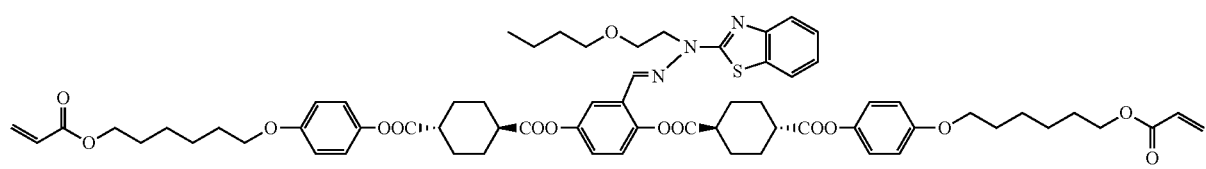

Polymerizable liquid crystal compound D

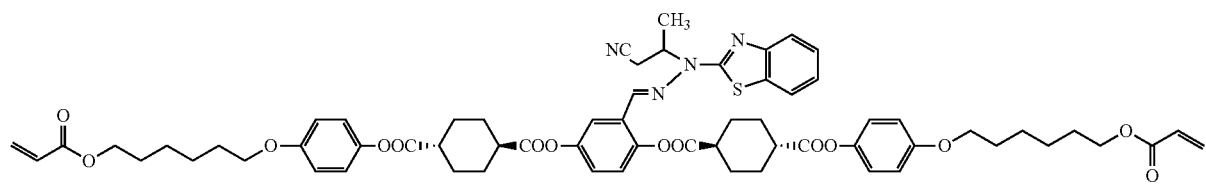

Polymerizable liquid crystal compound E

Polymerizable liquid crystal compound "LC242": polymerizable liquid crystal compound capable of expressing forward wavelength dispersion, represented by the following Formula (F1) ("LC242" available from BASF)

Polymerizable liquid crystal compound "K35": polymerizable liquid crystal compound capable of expressing forward wavelength dispersion, represented by the following Formula (F2)

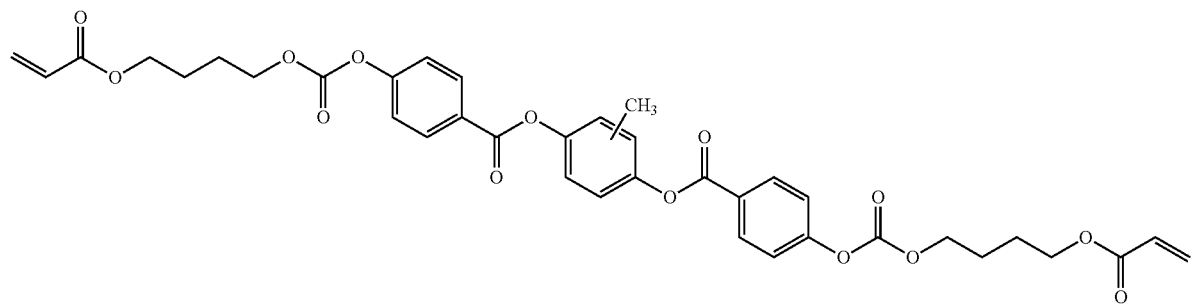

Polymerizable liquid crystal compound LC242

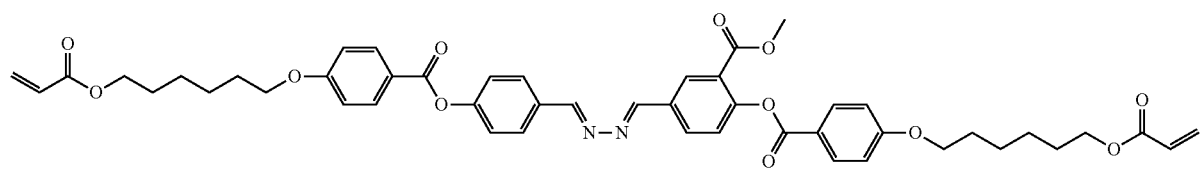

Polymerizable liquid crystal compound K35

Surfactant "S242": "Surflon S242" available from AGC Seimi Chemical Co., Ltd.
Surfactant "S243": "Surflon S243" available from AGC Seimi Chemical Co., Ltd.
Surfactant "S420": "Surflon S420" available from AGC Seimi Chemical Co., Ltd.
Surfactant "S611": "Surflon S611" available from AGC Seimi Chemical Co., Ltd.
Surfactant "208G": "FTERGENT FTX-208G" available from NEOS COMPANY LIMITED
Surfactant "FTX209": "FTERGENT FTX-209F" available from NEOS COMPANY LIMITED
Surfactant "FTX218": "FTERGENT FTX-218" available from NEOS COMPANY LIMITED
Surfactant "601AD": "FTERGENT FTX-601AD" available from NEOS COMPANY LIMITED
Surfactant "610FM": "FTERGENT FTX-610FM" available from NEOS COMPANY LIMITED
Surfactant "F251": "MEGAFACE F-251" available from DIC Corporation
Surfactant "F444": "MEGAFACE F-444" available from DIC Corporation
Surfactant "F554": "MEGAFACE F-554" available from DIC Corporation
Surfactant "F556": "MEGAFACE F-556" available from DIC Corporation
Surfactant "F562": "MEGAFACE F-562" available from DIC Corporation
Surfactant "RS-75": "MEGAFACE RS-75" available from DIC Corporation
Surfactant "PF6320" "PolyFox PF-6320" available from OMNOVA Solutions Inc.
Surfactant "PF656" "PolyFox PF-656" available from OMNOVA Solutions Inc.
Surfactant "PF6520" "PolyFox PF-6520" available from OMNOVA Solutions Inc.
Surfactant "NS9013": "NS-9013" available from DAIKIN INDUSTRIES, LTD.

F amount: ratio of fluorine atom in molecule of surfactant
Surfactant amount: amount of surfactant

TABLE 1

[Results of Examples 1 to 13 and Comparative Examples 1 to 14]

| | Polymerizable liquid crystal compound | | Surfactant | | | | Evaluation | |
|---|---|---|---|---|---|---|---|---|
| | Abbreviation | Wavelength dispersion | Abbreviation | Structure | F amount (wt %) | Surfactant amount (parts) | Surface state | Orientation |
| Ex. 1 | A | Inverse | F251 | Monomer | 23.3 | 0.30 | II | Excellent |
| Ex. 2 | A | Inverse | 601AD | Oligomer/ polymerizable | 19.2 | 0.30 | II | Excellent |
| Ex. 3 | A | Inverse | F554 | Oligomer | 18.1 | 0.30 | II | Excellent |
| Ex. 4 | E | Inverse | F554 | Oligomer | 18.1 | 0.30 | II | Excellent |
| Ex. 5 | A | Inverse | S242 | Monomer | 17.9 | 0.30 | I | Excellent |
| Ex. 6 | D | Inverse | S242 | Monomer | 17.9 | 0.50 | I | Excellent |
| Ex. 7 | A | Inverse | S243 | Monomer | 16.8 | 0.30 | II | Excellent |
| Ex. 8 | C | Inverse | S243 | Monomer | 16.8 | 0.50 | II | Excellent |
| Ex. 9 | A | Inverse | S611 | Dimer-trimer | 11.8 | 0.30 | II | Excellent |

TABLE 1-continued

[Results of Examples 1 to 13 and Comparative Examples 1 to 14]

| | Polymerizable liquid crystal compound | | Surfactant | | | | Evaluation | |
|---|---|---|---|---|---|---|---|---|
| | Abbreviation | Wavelength dispersion | Abbreviation | Structure | F amount (wt %) | Surfactant amount (parts) | Surface state | Orientation |
| Ex. 10 | A | Inverse | F562 | Oligomer | 11.4 | 0.30 | II | Excellent |
| Ex. 11 | A | Inverse | F556 | Oligomer | 11.0 | 0.30 | II | Excellent |
| Ex. 12 | B | Inverse | 601AD | Oligomer/polymerizable | 19.2 | 0.30 | II | Good |
| Ex. 13 | A | Inverse | RS-75 | Oligomer/polymerizable | 11.0 | 0.30 | II | Excellent |
| Comp. Ex. 1 | A | Inverse | 208G | Monomer | 54.2 | 0.30 | IV | Excellent |
| Comp. Ex. 2 | D | Inverse | 208G | Monomer | 54.2 | 0.30 | IV | Bad |
| Comp. Ex. 3 | A | Inverse | S420 | Monomer | 52.9 | 0.30 | IV | Excellent |
| Comp. Ex. 4 | C | Inverse | S420 | Monomer | 52.9 | 0.30 | III | Excellent |
| Comp. Ex. 5 | A | Inverse | FTX209 | Monomer | 50.6 | 0.30 | IV | Excellent |
| Comp. Ex. 6 | B | Inverse | FTX209 | Monomer | 50.6 | 0.30 | IV | Excellent |
| Comp. Ex. 7 | A | Inverse | FTX218 | Monomer | 47.4 | 0.30 | IV | Excellent |
| Comp. Ex. 8 | E | Inverse | FTX218 | Monomer | 47.4 | 0.30 | IV | Bad |
| Comp. Ex. 9 | A | Inverse | 610FM | Oligomer/polymerizable | 43.0 | 0.30 | II | Bad |
| Comp. Ex. 10 | A | Inverse | F444 | Monomer | 42.4 | 0.30 | II | Bad |
| Comp. Ex. 11 | A | Inverse | PF6520 | Oligomer | 39.6 | 0.30 | III | Excellent |
| Comp. Ex. 12 | A | Inverse | PF656 | Oligomer | 36.8 | 0.30 | IV | Excellent |
| Comp. Ex. 13 | A | Inverse | NS9013 | Monomer | 30.7 | 0.30 | IV | Excellent |
| Comp. Ex. 14 | A | Inverse | PF6320 | Oligomer | 30.6 | 0.30 | IV | Excellent |

TABLE 2

[Results of Comparative Examples 15 to 31]

| | Polymerizable liquid crystal compound | | Surfactant | | | | Evaluation | |
|---|---|---|---|---|---|---|---|---|
| | Abbreviation | Wavelength dispersion | Abbreviation | Structure | F amount (wt %) | Surfactant amount (parts) | Surface state | Orientation |
| Comp. Ex. 15 | LC242 | Forward | 208G | Monomer | 54.2 | 0.30 | IV | Good |
| Comp. Ex. 16 | K35 | Forward | 208G | Monomer | 54.2 | 0.50 | IV | Bad |
| Comp. Ex. 17 | LC242 | Forward | S420 | Monomer | 52.9 | 0.30 | III | Excellent |
| Comp. Ex. 18 | LC242 | Forward | FTX209 | Monomer | 50.6 | 0.30 | III | Excellent |
| Comp. Ex. 19 | LC242 | Forward | FTX218 | Monomer | 47.4 | 0.30 | IV | Bad |
| Comp. Ex. 20 | LC242 | Forward | 610FM | Oligomer/polymerizable | 43.0 | 0.30 | IV | Bad |
| Comp. Ex. 21 | LC242 | Forward | F444 | Monomer | 42.4 | 0.30 | IV | Bad |
| Comp. Ex. 22 | LC242 | Forward | PF6520 | Oligomer | 39.6 | 0.30 | IV | Excellent |
| Comp. Ex. 23 | LC242 | Forward | PF656 | Oligomer | 36.8 | 0.30 | III | Excellent |
| Comp. Ex. 24 | LC242 | Forward | NS9013 | Monomer | 30.7 | 0.30 | III | Excellent |

TABLE 2-continued

[Results of Comparative Examples 15 to 31]

| | Polymerizable liquid crystal compound | | Surfactant | | | Surfactant | Evaluation | |
|---|---|---|---|---|---|---|---|---|
| | Abbreviation | Wavelength dispersion | Abbreviation | Structure | F amount (wt %) | amount (parts) | Surface state | Orientation |
| Comp. Ex. 25 | LC242 | Forward | PF6320 | Oligomer | 30.6 | 0.30 | III | Excellent |
| Comp. Ex. 26 | LC242 | Forward | F251 | Monomer | 23.3 | 0.30 | III | Excellent |
| Comp. Ex. 27 | LC242 | Forward | F554 | Oligomer | 18.1 | 0.30 | III | Excellent |
| Comp. Ex. 28 | K35 | Forward | F554 | Oligomer | 18.1 | 0.50 | III | Good |
| Comp. Ex. 29 | LC242 | Forward | S242 | Monomer | 17.9 | 0.30 | III | Excellent |
| Comp. Ex. 30 | LC242 | Forward | S243 | Monomer | 16.8 | 0.30 | III | Excellent |
| Comp. Ex. 31 | LC242 | Forward | S611 | Dimer-trimer | 11.8 | 0.30 | IV | Bad |

DISCUSSION

As can be seen from Tables 1 and 2, in Examples in which a polymerizable liquid crystal compound with inverse wavelength dispersion was used in combination with a surfactant having a ratio of fluorine atom in the molecule of 30% by weight or less, a retardation layer having both excellent surface state and orientation was obtained. Among them, in Examples 1 to 11 and 13, particularly excellent results were obtained. This shows that use of the compound (I) wherein m and n are 1 as the polymerizable liquid crystal compound with inverse wavelength dispersion is preferable.

From each of graphs of retardation shown in FIGS. 9 to 12, the standard deviation Reσ of retardation was calculated as an evaluation index of non-uniformity of retardation of the retardation layer according to each of Examples 2 and 5 and Comparative Examples 3 and 5. From each of graphs of thickness shown in FIGS. 17 to 20, the standard deviation Δdσ of thickness was calculated as an evaluation index of thickness of the retardation layer according to each of Examples 2 and 5 and Comparative Examples 3 and 5. The results are shown in Table 3.

TABLE 3

| | Standard deviation | |
|---|---|---|
| | Non-uniformity of retardation Reσ (nm) | Thickness unevenness Δdσ (nm) |
| Ex. 2 | 2.4 | 8.6 |
| Ex. 5 | 2.2 | 6.6 |
| Comp. Ex. 3 | 5.4 | 78.1 |
| Comp. Ex. 5 | 3.6 | 32.4 |

As seen from Table 3, the standard deviation Reσ of retardation and the standard deviation Δdσ of thickness in Examples are all smaller than those in Comparative Examples. Consequently, it is confirmed that the non-uniformity of retardation and thickness unevenness of the retardation layer can be decreased by the present invention.

The invention claimed is:

1. A liquid crystal composition comprising:
    a polymerizable liquid crystal compound capable of expressing birefringence with inverse wavelength dispersion;
    a surfactant containing a fluorine atom; and
    a solvent, wherein
    the surfactant contains a fluorine atom at a ratio of 25% by weight or less in a molecule of the surfactant,
    the ratio of the fluorine atom in the molecule of the surfactant is measured by a method comprising steps of:
    combusting the surfactant to generate a gas;
    absorbing the gas into a solution to obtain an absorbing liquid; and
    analyzing a part of the absorbing liquid by ion chromatography to measure the ratio of the fluorine atom in the molecule of the surfactant.

2. The liquid crystal composition according to claim 1, wherein the polymerizable liquid crystal compound includes a main chain mesogen and a side chain mesogen bonded to the main chain mesogen in a molecule of the polymerizable liquid crystal compound.

3. The liquid crystal composition according to claim 1, wherein the polymerizable liquid crystal compound is represented by the following Formula (I):

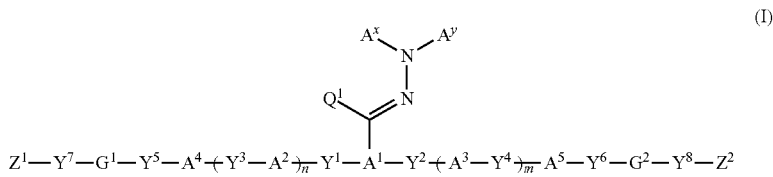

where, $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; provided that a case where two or more —O— or —S— groups are adjacently inserted are excluded, wherein R$^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon group of 5 to 12 carbon atoms; R$^4$ is an alkyl group of 1 to 20 carbon atoms, an alkenyl group of 2 to 20 carbon atoms, a phenyl group, or a 4-methylphenyl group; R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m and n are each independently 0 or 1.

4. A method for producing a retardation layer, comprising the steps of:

applying the liquid crystal composition according to claim 1 onto a supporting surface to form a layer of the liquid crystal composition;

orienting the polymerizable liquid crystal compound contained in the layer of the liquid crystal composition; and polymerizing the polymerizable liquid crystal compound to obtain the retardation layer.

5. A circularly polarizing plate comprising:

a linear polarizer; and the retardation layer according to claim 4.

6. The liquid crystal composition according to claim 1, wherein the amount of the surfactant containing a fluorine atom is 0.05 parts by weight or more and 5.0 parts by weight or less relative to 100 parts by weight of the polymerizable liquid crystal compound.

* * * * *